US011869258B1

(12) United States Patent
Kündig et al.

(10) Patent No.: US 11,869,258 B1
(45) Date of Patent: *Jan. 9, 2024

(54) CLASSIFYING AND SEGMENTING CHARACTERS WITHIN AN IMAGE

(71) Applicant: Scandit AG, Zürich (CH)

(72) Inventors: Christian Kündig, Zürich (CH); Oliver Akermann, Zürich (CH); Bernd Schoner, New York, NY (US); Luc Humair, Zürich (CH)

(73) Assignee: Scandit AG, Zurich (CH)

(*) Notice: Subject to any disclaimer, the term of this patent is extended or adjusted under 35 U.S.C. 154(b) by 0 days.

This patent is subject to a terminal disclaimer.

(21) Appl. No.: 18/051,590

(22) Filed: Nov. 1, 2022

Related U.S. Application Data

(63) Continuation of application No. 17/549,805, filed on Dec. 13, 2021, now Pat. No. 11,495,036.
(Continued)

(51) Int. Cl.
*G06V 30/14* (2022.01)
*G06V 30/18* (2022.01)
(Continued)

(52) U.S. Cl.
CPC ........ *G06V 30/148* (2022.01); *G06V 30/1801* (2022.01); *G06K 19/06028* (2013.01)

(58) Field of Classification Search
CPC ............. G06V 30/148; G06V 30/1801; G06K 19/06028
See application file for complete search history.

(56) References Cited

U.S. PATENT DOCUMENTS

| 4,167,756 A | 9/1979 | Smith |
|---|---|---|
| D344,261 S | 2/1994 | Watanabe |

(Continued)

FOREIGN PATENT DOCUMENTS

| EP | 3167404 A1 | 5/2017 |
|---|---|---|
| JP | 2004032507 A | 1/2004 |

(Continued)

OTHER PUBLICATIONS

"Code Reader 4405 User Manual", Code Product Line Version 03, Release date: Jan. 2016,. Code Corporation, Accessed on: Dec. 22, 2020 [Online]. Retrieved from: https://web.archive.org/web/20181223184651/http://www.codecorp.com/products.php?id=167, 16 pages.

(Continued)

*Primary Examiner* — Gregory M Desire
(74) *Attorney, Agent, or Firm* — Kilpatrick Townsend & Stockton LLP

(57) ABSTRACT

An image is acquired by a camera. The image has a first set of characters and a second set of characters. The first set of characters are classified as an identifier. The second set of characters are classified as data associated with the identifier. The image is divided to create an image segment. The image segment includes the first set of characters and not the second set of characters. The first set of characters are decoded in the image segment to generate a first character string. The second set of characters are decoded to generate a second character string. The first character string is linked to the second character string based on classifying the first set of characters as the identifier and the second set of characters as the data associated with the identifier.

20 Claims, 16 Drawing Sheets

Related U.S. Application Data

(60) Provisional application No. 63/143,269, filed on Jan. 29, 2021.

(51) Int. Cl.
*G06K 19/06* (2006.01)
*G06V 30/148* (2022.01)

(56) References Cited

U.S. PATENT DOCUMENTS

| | | | |
|---|---|---|---|
| 5,744,815 A | 4/1998 | Gurevich et al. | |
| D473,872 S | 4/2003 | Ausems et al. | |
| 6,580,453 B1 | 6/2003 | Hirasawa | |
| D576,197 S | 9/2008 | Takagi | |
| 7,457,407 B2 | 11/2008 | Sun et al. | |
| D654,931 S | 2/2012 | Lemelman et al. | |
| D658,174 S | 4/2012 | Tasselli et al. | |
| D659,564 S | 5/2012 | Baxter | |
| 8,223,203 B2 | 7/2012 | Ohsumi et al. | |
| D667,823 S | 9/2012 | Merenda | |
| D670,278 S | 11/2012 | Hamann | |
| D672,386 S | 12/2012 | Matunuma et al. | |
| D678,870 S | 3/2013 | Fathollahi | |
| D678,936 S | 3/2013 | Oliver | |
| D685,360 S | 7/2013 | Chen et al. | |
| D688,654 S | 8/2013 | Stevinson | |
| 8,596,540 B2 | 12/2013 | Adelmann | |
| D698,772 S | 2/2014 | Merenda | |
| 8,744,173 B2* | 6/2014 | Vincent | G06T 3/4053 382/101 |
| D710,343 S | 8/2014 | Chandler, Jr. et al. | |
| D710,346 S | 8/2014 | Smith et al. | |
| 8,798,453 B2 | 8/2014 | Lawton | |
| D716,285 S | 10/2014 | Chaney et al. | |
| D716,785 S | 11/2014 | White | |
| D717,287 S | 11/2014 | Macrina et al. | |
| D717,304 S | 11/2014 | Yturralde et al. | |
| D719,166 S | 12/2014 | Brown et al. | |
| D719,167 S | 12/2014 | Brown et al. | |
| D724,573 S | 3/2015 | Stevinson | |
| D726,701 S | 4/2015 | Stevinson | |
| 9,019,420 B2 | 4/2015 | Hurst et al. | |
| D728,551 S | 5/2015 | Saeki et al. | |
| D732,011 S | 6/2015 | Stevinson | |
| D733,112 S | 6/2015 | Chaney et al. | |
| D734,336 S | 7/2015 | Mistkawi et al. | |
| D744,470 S | 12/2015 | Stevinson | |
| D748,085 S | 1/2016 | Merenda | |
| D754,114 S | 4/2016 | Curtis et al. | |
| D754,650 S | 4/2016 | Curtis et al. | |
| D759,004 S | 6/2016 | Stevinson | |
| D760,209 S | 6/2016 | Weng et al. | |
| D760,212 S | 6/2016 | Mao et al. | |
| 9,378,435 B1* | 6/2016 | Prulhiere | G06T 7/143 |
| D760,710 S | 7/2016 | Ozolins et al. | |
| D761,240 S | 7/2016 | Ozolins et al. | |
| D768,617 S | 10/2016 | Merenda | |
| D771,631 S | 11/2016 | Fitch et al. | |
| 9,626,577 B1* | 4/2017 | Yu | G06V 20/63 |
| 9,654,675 B2 | 5/2017 | Kessler | |
| 9,836,635 B2 | 12/2017 | Negro et al. | |
| 10,013,643 B2 | 7/2018 | Yellapragada et al. | |
| 10,191,242 B2 | 1/2019 | Palmeri | |
| 10,200,599 B1 | 2/2019 | Baldwin | |
| 10,229,301 B2 | 3/2019 | Cumoli et al. | |
| D860,180 S | 9/2019 | Lehmann et al. | |
| D862,441 S | 10/2019 | Eppler et al. | |
| 10,426,442 B1 | 10/2019 | Schnorr | |
| 10,452,959 B1 | 10/2019 | Gautam et al. | |
| 10,455,163 B2* | 10/2019 | Kanatsu | G06F 18/24 |
| 10,489,668 B2* | 11/2019 | Quentin | G06V 30/18124 |
| 10,558,844 B2 | 2/2020 | D'Ercoli et al. | |
| 10,621,435 B2 | 4/2020 | Bridges | |
| 10,818,014 B2 | 10/2020 | Xu et al. | |
| 10,846,561 B1 | 11/2020 | Floerkemeier et al. | |
| 10,963,658 B1 | 3/2021 | Bloch et al. | |
| 11,216,628 B2 | 1/2022 | Scherly et al. | |
| 11,244,147 B2 | 2/2022 | Floerkemeier et al. | |
| 11,295,163 B1* | 4/2022 | Schoner | G06K 7/1491 |
| 2003/0202697 A1 | 10/2003 | Simard et al. | |
| 2006/0075241 A1 | 4/2006 | Deguillaume et al. | |
| 2006/0249581 A1 | 11/2006 | Smith | |
| 2007/0116454 A1 | 5/2007 | Tsai | |
| 2009/0002797 A1 | 1/2009 | Kwong et al. | |
| 2009/0033786 A1 | 2/2009 | Finkelstein et al. | |
| 2009/0108071 A1 | 4/2009 | Carlson | |
| 2009/0212113 A1 | 8/2009 | Chiu et al. | |
| 2009/0304234 A1 | 12/2009 | Kondo et al. | |
| 2010/0102129 A1 | 4/2010 | Drzymala et al. | |
| 2010/0328420 A1 | 12/2010 | Roman | |
| 2011/0007205 A1 | 1/2011 | Lee | |
| 2011/0043683 A1 | 2/2011 | Beach et al. | |
| 2011/0081946 A1 | 4/2011 | Singh | |
| 2013/0076697 A1 | 3/2013 | Goertz et al. | |
| 2013/0112750 A1 | 5/2013 | Negro et al. | |
| 2013/0147839 A1 | 6/2013 | Fukushima et al. | |
| 2013/0206839 A1 | 8/2013 | Gao | |
| 2013/0329115 A1 | 12/2013 | Palmeri | |
| 2014/0168468 A1 | 6/2014 | Levoy et al. | |
| 2014/0171150 A1 | 6/2014 | Hurst et al. | |
| 2014/0232930 A1 | 8/2014 | Anderson | |
| 2014/0285913 A1 | 9/2014 | Palmeri | |
| 2014/0327815 A1 | 11/2014 | Auger | |
| 2015/0048167 A1 | 2/2015 | Russell et al. | |
| 2015/0053765 A1 | 2/2015 | Powell et al. | |
| 2015/0116547 A1 | 4/2015 | Laroia | |
| 2015/0220766 A1 | 8/2015 | Russell et al. | |
| 2016/0070944 A1 | 3/2016 | McCloskey et al. | |
| 2016/0077307 A1 | 3/2016 | Palmeri | |
| 2016/0188941 A1 | 6/2016 | Todeschini et al. | |
| 2016/0307006 A1 | 10/2016 | Wang | |
| 2016/0321819 A1 | 11/2016 | Morgan-Mar et al. | |
| 2016/0323508 A1 | 11/2016 | Ayalasomayajula et al. | |
| 2017/0013179 A1 | 1/2017 | Kang et al. | |
| 2017/0032311 A1 | 2/2017 | Rizzolo et al. | |
| 2017/0041540 A1 | 2/2017 | Foster et al. | |
| 2018/0081417 A1 | 3/2018 | Chan et al. | |
| 2018/0120106 A1 | 5/2018 | Sato | |
| 2018/0137319 A1 | 5/2018 | Giordano et al. | |
| 2018/0342050 A1 | 11/2018 | Fitzgerald et al. | |
| 2019/0188435 A1 | 6/2019 | Davis et al. | |
| 2019/0244043 A1 | 8/2019 | Bradley et al. | |
| 2019/0304132 A1 | 10/2019 | Yoda et al. | |
| 2019/0325183 A1 | 10/2019 | Tscherepanow et al. | |
| 2020/0042803 A1 | 2/2020 | Yamaguchi | |
| 2020/0084375 A1 | 3/2020 | Tadano et al. | |
| 2020/0202095 A1 | 6/2020 | Yoda | |
| 2020/0258033 A1 | 8/2020 | Yonezawa et al. | |

FOREIGN PATENT DOCUMENTS

| | | | |
|---|---|---|---|
| JP | 2019094191 A | 6/2019 | |
| KR | 20020077090 A | 10/2002 | |
| KR | 20060102957 A | 9/2006 | |
| WO | 0131893 A1 | 5/2001 | |
| WO | 2016007662 A1 | 1/2016 | |
| WO | 2019135163 A2 | 7/2019 | |

OTHER PUBLICATIONS

"Flens—The First Flashlight Booster for Smartphones", created by Basilico, Kickstarter, last updated Dec. 11, 2019, Accessed on Mar. 26, 2021 from https://kickstarter.com/projects/basilico/flen-the-first-flashlight-booster-for-smartphones, 26 pages.

"Linea Pro Extreme Rugged Case". Infinite Peripherals, iOS Accessories, Linea Pro and Infinea Tab Accessories, Retrieved on Dec. 22, 2020 from https://web.archive.org/web/20150825044354/http://ipcprint.com/linea-pro-extreme-rugged-case.html 3 page.

Brownlee; Jason, "Deep Learning Models for Human Activity Recognition", Deep Learning for Time Series, Navigation, last updated Aug. 5, 2019, 16 pages.

(56) References Cited

OTHER PUBLICATIONS

Scandit, "Scandit Augmented Reality Retail Price Label Verification", posted Sep. 26, 2018, retrieved on Aug. 4, 2020 from https://www.scandit.com/resources/videos/scandit-augmented-reality-retail-price-label-verification/ , 5 pages.

Scandit, "Scandit Augmented Reality for Smart Devices", posted Oct. 2, 2019, retrieved on Dec. 2, 2020 from https://www.scandit.com/resources/videos/scandit-augmented-reality-for-smart-devices/, 3 pages.

Scandit, "Scandit Augmented Retail Product Information Using AR", posted Sep. 26, 2018, retrieved on Dec. 2, 2020 from https://www.scandit.com/resources/videos/scandit-augmented-retail-product-information-using-ar/, 5 pages.

Scandit, "Scandit Augmented Reality Retail Click and Collect", posted Sep. 26, 2018, retrieved on Dec. 2, 2020 from https://www.scandit.com/resources/videos/scandit-augmented-reality-retail-click-and-collect/, 4 pages.

Scandit, "Scandit Augmented Reality Retail Shelf Management", posted Sep. 26, 2018, retrieved on Dec. 2, 2020 from https://www.scandit.com/resources/videos/scandit-augmented reality-retail-shelf-management/, 4 pages.

Scandit, "Computer Vision and Augmented Reality for Enterprise Applications", posted Jun. 6, 2018, retrieved on Dec. 2, 2020 from https://www.scandit.com/resources/videos/computer-vision-and-augmented reality-for-enterprise-applications/, 2 pages.

Invitation to Pay Additional Fees And, Where Applicable, Protest Fee, dated Jun. 17, 2021 in International Patent Application No. PCT/US2021/025212, 2 pages.

U.S. Appl. No. 16/920,061 received a Pre-Interview First Office Action dated Sep. 16, 2020, 6 pages.

U.S. Appl. No. 16/920,061 received a Notice of Allowance dated Dec. 2, 2020, 10 pages.

U.S. Appl. No. 17/396,123 received a Non-Final Office Action, dated Dec. 2, 2021, 6 pages.

U.S. Appl. No. 17/139,529 received a First Action Interview Pilot Program Pre-Interview Communication dated Dec. 22, 2022, 6 pages.

Final Office Action for U.S. Appl. No. 17/139,529 dated May 8, 2023, all pages.

\* cited by examiner

CLASSIFYING AND SEGMENTING CHARACTERS WITHIN AN IMAGE

CROSS-REFERENCES TO RELATED APPLICATIONS

This application is a continuation of U.S. Non-Provisional patent application Ser. No. 17/549,805, filed on Dec. 13, 2021, which claims priority to U.S. Provisional Application No. 63/143,269, filed on Jan. 29, 2021, the disclosures of which are incorporated by reference in their entirety for all purposes.

BACKGROUND

This disclosure relates in general to a camera in a mobile device. More specifically, and without limitation, this disclosure relates to decoding barcodes in a scene or image using the camera in the mobile device. Barcodes have traditionally been scanned using a specialized scanner. For example, a barcode scanner comprising a laser is used to shine light on a barcode, and reflected light from the barcode is detected and used to decode the barcode. As mobile devices (e.g., smartphones and tablets) with cameras have become more common, mobile devices are being used to decode codes by acquiring an image of a code and using image analysis to decode the code. An example of a method for using as smartphone to decode a barcode is provided in U.S. Pat. No. 8,596,540, granted on Dec. 3, 2013.

BRIEF SUMMARY

This disclosure relates in general to applications of optical character recognition used to assist with the decoding of optical patterns. Mobile devices having a camera, and being capable of hosting mobile applications, offer a flexible and scalable solution for optical pattern decoding. However, detecting and/or decoding characters in an image (e.g., optical character recognition, OCR) can be resource intensive. To speed OCR in an image, in some embodiments an image can be segmented and OCR run on only the segment of the image. In some embodiments, machine learning can be used to OCR specific classes of text (e.g., and not others), thereby reducing computation because text not in the class is not OCR'd. In some embodiments, a flexible pipeline can be used to provide tailored, application-specific class identification for text to OCR. In some configurations, techniques, methods, and/or systems can be applied to augment optical code scanning in different use cases, irrespective of the type of text to be scanned.

In certain embodiments, an apparatus for image analysis using visual geometry as an anchor for optical character recognition comprises a camera and one or more processors. The one or more processors are configured to: receive an image acquired by a camera; analyze the image to detect a location within the image having a specified geometry, wherein the specified geometry is a predefined, visual geometry; divide the image to create an image segment, where the image segment is based on the location of the specified geometry within the image; analyze the image segment to detect one or more characters within the image segment; decode the one or more characters in the image segment; and/or generate a character string based on decoding the one or more characters in the segment. In some embodiments, the specified geometry is an arrangement of rectangles.

In certain embodiments, a method for image analysis using visual geometry as an anchor for optical character recognition comprises: receiving an image acquired by a camera; analyzing the image to detect a location within the image having a specified geometry, wherein the specified geometry is a predefined, visual geometry; dividing the image to create an image segment, where the image segment is based on the location of the specified geometry within the image; analyzing the image segment to detect one or more characters within the image segment; decoding the one or more characters in the image segment; and/or generating a character string based on decoding the one or more characters in the image segment. In some embodiments, the specified geometry is a class of barcodes; the specified geometry is an arrangement of rectangles; the arrangement of rectangles is a one-dimensional code (e.g., a barcode); the arrangement of rectangles is a two-dimensional code (e.g., a QR code); the specified geometry is a label; a type of label (e.g., price label, mailing label, etc.), the specified geometry is multiple lines of text extending a specified distance; the specified geometry is a symbol; and/or analyzing the image segment to detect the one or more characters comprises identifying characters of the largest font within the image segment.

In some configurations, a method for image analysis using feature detection for optical character recognition comprises receiving an image acquired by a camera; analyzing the image to detect a feature, wherein detecting the feature is based on machine learning; dividing the image to create an image segment, where the image segment is based on a location of the feature in the image; analyzing the image segment to detect one or more characters within the image segment; decoding the one or more characters in the image segment; and/or generating a character string based on decoding the one or more characters in the segment.

In some configurations, an apparatus for image analysis using a visual feature as an anchor for optical character recognition comprises a camera; one or more sensors, in addition to the camera; and/or one or more processors configured to: receive an image acquired by the camera; analyze the image to detect a location within the image having a specified feature, wherein the specified feature is a visual feature; divide the image to create an image segment, where the image segment is based on the location of the specified feature within the image; analyze the image segment to detect one or more characters within the image segment; decode the one or more characters in the image segment; and/or generate a character string based on decoding the one or more characters in the segment. In some embodiments, the feature is a predefined, visual geometry; and/or detecting the feature is based on machine learning.

In some configurations, a method for image analysis using text classification for optical character recognition comprises receiving an image acquired by a camera, wherein the image comprises a first set of characters and a second set of characters; analyzing, at least a portion of the image, to classify the first set of characters as belonging to a specified class of text, wherein the specified class is predefined; decoding the first set of characters and not decoding the second set of characters, based on the first set of characters classified as belonging to the specified class and the second set of characters not being classified as belonging to the specified class; and/or generating a character string based on decoding the first set of characters. In some embodiments, the method further comprises: analyzing the image to detect a feature, wherein detecting the feature is based on machine learning; dividing the image to create an image segment, where the image segment is based on a location of the feature in the image; the portion of the image is the image segment; saving the character string to memory; classifying text based on features of text; using machine learning for classification; and/or analyzing the second set of characters to classify the second set of characters as belonging to a second specified class of text, wherein the second specified class is predefined.

In some configurations, a method for image analysis using a flexible pipeline comprises training a first engine to identify a first class of text; training a second engine to identify a second class of text; providing a first user the first engine for detecting the first class of text; and/or providing a second user the second engine for detecting the second class of text.

In some configurations, a method for image analysis using optical character recognition with barcode detection comprises receiving an image acquired by a camera; analyzing the image to detect a barcode in the image; attempting to decode the barcode in the image; ascertaining that attempting to decode the barcode failed; dividing the image to create an image segment, where the image segment is based on a location of the barcode in the image; analyzing the image segment to detect one or more characters within the image segment; decoding the one or more characters in the image segment; and/or generating a character string based on decoding the one or more characters in the segment.

In some configurations, a method for decoding information on a label comprises acquiring an image of the label wherein the label contains alphanumeric characters and one or more barcodes; decoding the one or more barcodes; performing optical character recognition on the alphanumeric characters of the label; analyzing positions of the alphanumeric characters relative to the one or more barcodes; correlating the alphanumeric characters with the one or more barcodes; and/or reporting the alphanumeric characters correlated with the one or more barcodes.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Examples of optical patterns include 1D barcodes, 2D barcodes, numbers, letters, and symbols. As scanning optical patterns is moved to mobile devices, there exists a need to increase scanning speed, increase accuracy, and/or manage processing power. Interpreting an optical pattern (e.g., scanning for an optical pattern) can be divided into two steps: detecting and decoding. In the detecting step, a position of an optical pattern within an image is identified and/or a boundary of the optical pattern is ascertained. In the decoding step, the optical pattern is decoded (e.g., to provide a character string, such as a numerical string, a letter string, or an alphanumerical string). As optical patterns, such as barcodes and QR codes, are used in many areas (e.g., shipping, retail, warehousing, travel), there exists a need for quicker scanning of optical patterns. In some embodiments, optical patterns can include alpha and/or numerical characters. The following are techniques that can increase the speed, accuracy, and/or efficiency of scanning for optical patterns. The following techniques can be used individually, in combination with each other, and/or in combination with other techniques.

Figure 1:
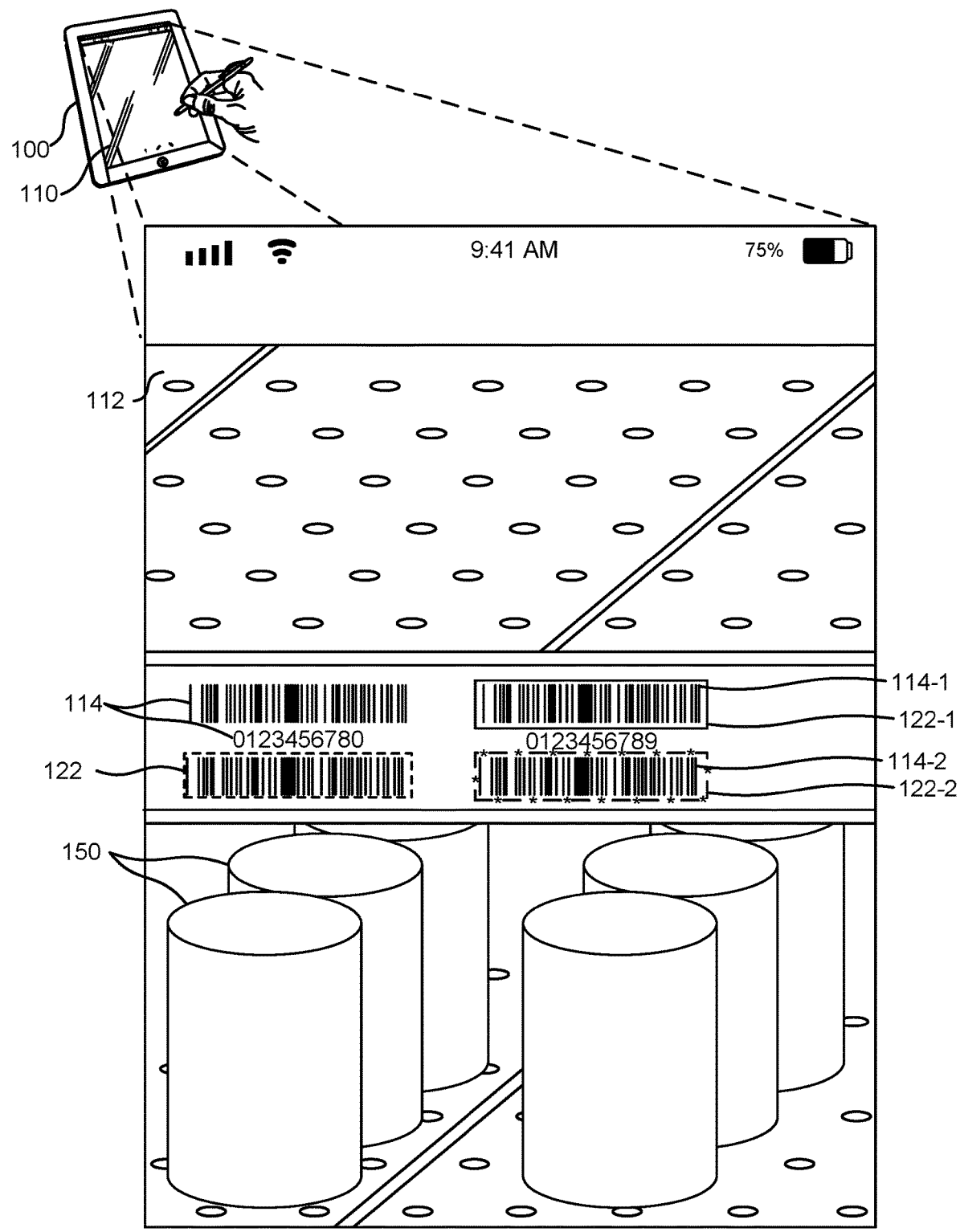
FIG. 1 depicts an example technique for automated recognition and decoding of a pattern in an image containing multiple patterns, in accordance with some embodiments.

FIG. 1 depicts an example technique for automated detection and decoding of one or more optical patterns in an image, in accordance with some embodiments. In FIG. 1, a system 100 (e.g., a mobile device) comprises a display 110 and a camera. The camera has a field of view (FOV) of a real scene. The camera is configured to capture an image 112 of the real scene. The real scene contains one or more optical patterns 114.

The camera can capture a plurality of images. The plurality of images can be presented in "real time" on the display 110 (e.g., presented on the display 110 in a sequential manner following capture, albeit potentially with some latency introduced by system processes). The image 112 is one of the plurality of images. The plurality of images depict the real world scene as viewed through the field of view of the camera. The real world scene may include multiple objects 150, patterns, or other elements (e.g., faces, images, colors, etc.) of which the optical patterns 114 are only a part. FIG. 1 depicts a first optical pattern 114-1 and a second optical pattern 114-2, among other optical patterns 114.

The image 112 may be captured by the camera and/or provided via additional or alternative system processes (e.g., from a memory device, a communications connection to an online content network, etc.). The optical patterns 114 are detected and/or recognized in the image 112. Detection and recognition of optical patterns may describe different approaches for image analysis of optical patterns. Detection may describe detecting an optical pattern in an image by characteristic discrete patterns (e.g., parallel bars or symbols). Recognition may include additional analysis of the pattern that provides descriptive and/or characteristic information (e.g., an optical pattern type), specific to the optical pattern, but does not necessarily include decoding the optical pattern. For example, a barcode may be detected in an image based on image analysis revealing a region of the image containing multiple parallel bars. After additional analysis, the barcode may be recognized as a UPC code. In some embodiments, detection and recognition are concurrent steps implemented by the same image analysis process, and as such are not distinguishable. In some embodiments, image analysis of optical patterns proceeds from detection to decoding, without recognition of the optical pattern. For example, in some embodiments, an approach can be used to detect a pattern of characters, and in a second step decode the characters with optical character recognition (OCR).

Detecting optical patterns 114 permits automatic (e.g., without user interaction) generation and/or presentation on the display 110 of one or more graphical elements 122. In some embodiments, the graphical elements 122 may include, but are not limited to highlighted regions, boundary lines, bounding boxes, dynamic elements, or other graphical elements, overlaid on the image 112 to emphasize or otherwise indicate the positions of the optical patterns 114 in the plurality of images. Each optical pattern 114 may be presented with one or more graphical elements, such that a user is presented the positions of the optical patterns 114 as well as other metadata, including but not limited to pattern category, decoding status, or information encoded by the optical patterns 114.

The system 100 may identify one or more of the optical patterns 114 for decoding. As mentioned above, the decoding may be automated, initializing upon detection of an optical pattern 114 and successful implementation of a decoding routine. Subsequent to detection and/or decoding, object identifier information, optical pattern status, or other information to facilitate the processing of the optical patterns 114 may be included by a graphical element 122 associated with an optical pattern 114 that is decoded. For example, a first graphical element 122-1, associated with the first optical pattern 114-1, may be generated and/or presented via the display 110 at various stages of optical pattern detection and/or decoding. For example, after recognition, the first graphical element 122-1 may include information about an optical pattern template category or the number of patterns detected. Following decoding, the first graphical element 122-1 may present information specific to the first optical pattern 114-1. For an optical pattern 114 that is detected, but decoding is unsuccessful, the system 100 may alter a graphical element 122 to indicate decoding failure, as well as other information indicative of a source of the error. As an illustrative example, a second graphical element 122-2 may indicate that the second optical pattern 144-2 cannot be decoded by the system 100, for example, through dynamic graphical elements or textual information. For example, the second graphical element 122-2 is a yellow box surrounding the second optical pattern 114-2 after the second optical pattern 114-2 is detected; the second graphical element 122-2 is changed to a red box if the second optical pattern 114-2 is not decoded, or is changed to a green box if the second optical pattern 114-2 is decoded. Examples of graphical elements used during detecting and decoding optical patterns can be found in U.S. application Ser. No. 16/905,722, filed on Jun. 18, 2020, which is incorporated by reference for all purposes. Optical patterns can also be tracked, as described in U.S. patent application Ser. No. 16/920,061, filed on Jul. 2, 2020, which is incorporated by reference for all purposes.

A. OCR Support Scanning

Figure 2:
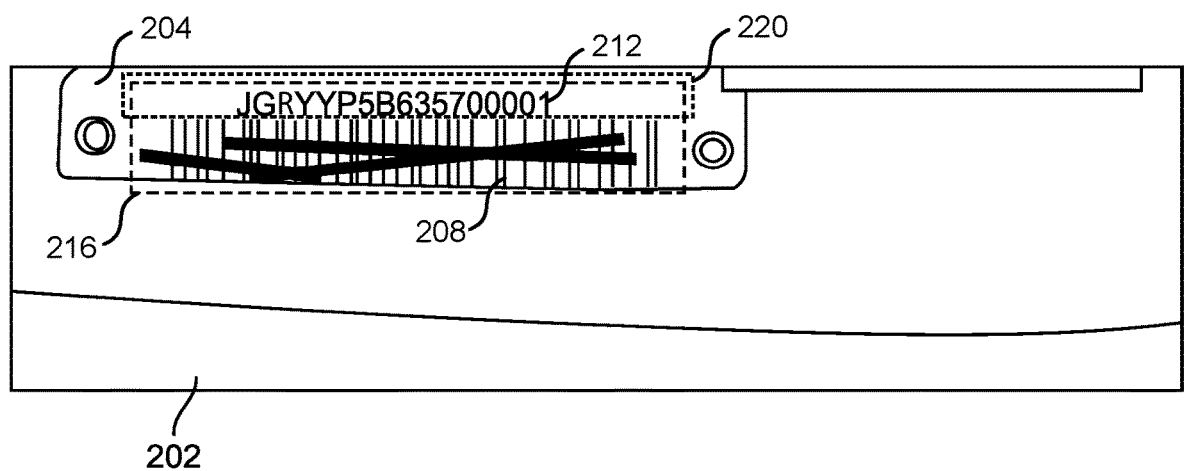
FIG. 2 depicts an embodiment for using optical character recognition as a backup to barcode scanning.

FIG. 2 depicts an embodiment for using optical character recognition as a backup to barcode scanning. In FIG. 2, an image 202 of a label 204 containing a vehicle identification number (VIN) is shown. The VIN includes both a barcode 208 and an alphanumeric code 212. The alphanumeric code comprises a set of characters. A character can be a letter, a number, or a character symbol (e.g., "/", ",", ".", ";", "'", "@", "#", "$", "%", "^", "&", "*", "<", ">", "+", "-", "=", etc.). In some embodiments, a character symbol is limited to what can commonly be typed on a personal computer.

A system, (e.g., system 100 in FIG. 1), scans the alphanumeric code 212 if the barcode 208 isn't decodable (e.g., the barcode is damaged, torn, blocked, washed out by glare, or missing). Scanning the alphanumeric code 212 can include one or both of the following to facilitate a text scan: (i) a user interaction; (ii) automatically detecting that the barcode 208 can be localized but not scanned, or automatically detecting that the barcode 208 is missing.

In some embodiments, text recognition can be used as an alternative data capture capability where optical code scanning fails. Scenarios for this include, but are not limited to damaged barcodes, partially visible barcodes, removed barcodes, products and objects that aren't fully labeled with barcodes, barcodes that are too blurry due to distance, where text may require less resolution in certain situations, and/or barcodes with printing issues.

In some embodiments, OCR support scanning is an add-on to a barcode scanner, such that barcode scanning is the first approach applied, or both OCR and barcode scanning are implemented concurrently.

In some embodiments, a system implementing OCR support scanning may learn optical pattern structures from past scans to automatically define what strings to scan/select. In this way, the system may detect "broken" barcodes with barcode localization and trigger OCR scans close to the localized barcode. With OCR support scanning, exception handling may be reduced for processes where barcodes can be damaged during regular handling of a product or other goods.

Alphanumeric, human readable representations of an optical pattern may be used to assist with the decoding of the barcode. In some embodiments, an optical pattern is only partially decoded, for example due to physical damage in some area of the barcode. Subsequently, the alphanumeric number can be recognized via OCR and the missing information from the barcode can be added using the decoded alphanumeric characters.

In some embodiments, the decoding of the alphanumeric characters is used to detect potential errors with the decoding of a barcode. For example, if the two decoded strings are not identical, there is a possibility that the barcode was not correctly decoded. This can be used to reduce or eliminate errors in barcode decoding (e.g., false positives). For example, it is possible to repeat the barcode scanning attempt and/or the OCR attempt until the two results match.

In some embodiments, OCR support scanning may include, but is not limited to: (i) receiving a manual selection of text; (ii) enabling improved OCR integration with the optical code scanner; (iii) automatically selecting one of many fields that match a registration or other identifier; (iv) automatically locating text that is near an optical pattern, and scanning the text if localized barcode is too damaged to be decoded; (v) receiving a manual selection of a barcode that cannot be scanned for text scanning with OCR; (vi) receiving a manual selection of a single or of multiple text objects by type of text visible in a region of an image; (vii) automatically scanning text according to patterns defined in the application or automatically recognized by the scanner based on previously scanned barcodes; (viii) fixing an area of an image for OCR; and/or (ix) receiving a manual selection of text in an image (e.g., a portion of an image or anywhere in an image).

In some embodiments, OCR may be automatically triggered. For example, a system may automatically detect that an optical code has been found but not scanned (with localization). Additionally and/or alternatively, if an optical code is found but not decoded, a system may detect and recognize text next to optical patterns based on proximity in an image. Configuration of OCR may also be automatic. For example, a system may automatically learn an optical pattern format from previous scans to configure OCR text pattern and length.

In the embodiment shown in FIG. 2, an image of the label 204 is acquired by a camera of a mobile device. The image is analyzed to detect the barcode 208 in the image. An attempt is made to decode the barcode 208 (e.g., either locally on the mobile device or at a remote server based on an uploaded image from the mobile device). However, the system (e.g., the mobile device and/or a remote server) ascertains that that the barcode 208 cannot be decoded (e.g., receives an error message). For example, there are lines through the barcode 208, rendering the barcode 208 unreadable by some systems and/or algorithms. After ascertaining the barcode 208 cannot be decoded, the system scans the image 202, or scans a portion of the image (e.g., an image segment), to decode the alphanumeric code 212. For example, the image 202 could be divided to create the image segment. An image segment is a portion of the image. The image 202 is divided based on the location of the barcode 208 in the image 202. The image 202 can be divided based on a dimension of the barcode 208. For example, the image segment could be defined by an area that is as wide as the barcode 208 and n times the height of the barcode, wherein n is equal to or greater than 2 or 3 and equal to or less than 2, 3, 4, or 5. In FIG. 2, the image segment, segment 216, is twice as tall as the barcode 208 (e.g., segment 216) and bottom justified on the barcode 208 because the alphanumeric code 212 is expected to be above the barcode 208. Length is not changed because the alphanumeric code 212 is expected to be above or below the barcode 208, and not to the side of the barcode 208). In another example, the image segment, segment 220, is defined as an area in relation to (e.g., above) the barcode 208 (e.g., a height of the image segment is k times the height of the barcode, wherein k is equal to or greater than 0.25, 0.5, 0.75, 1, 1.5, or 2 and/or equal to or less than 0.5, 1, 1.5, 2, 5, or 10).

In some embodiments, the image segment includes the barcode 208 and an area adjacent to (e.g., contiguous with) an area of the barcode 208 (e.g., the image segment could be the area of the barcode 208 plus the area of segment 220) as shown by segment 216. A person skilled in the art will recognize various configurations based on characters positioned in relation to an optical code (e.g., characters could be above, below, left, right, embedded, or partially embedded in a barcode).

On a price label, a description of a product could be separated a known distance from a location of barcode. Accordingly, in some embodiments, an area of the image segment is not contiguous with an area of the barcode. Since a location of the barcode is used to segment an image for optical character recognition, it can be said that the barcode is an anchor for OCR, because the barcode can provide position information to define an image segment location and/or size. Though a barcode can be used as an anchor for OCR, there can be other anchors for OCR.

By running optical character recognition on the image segment, and not on the entire image, OCR can be run more quickly and/or not use as much computational resources. For example, an optical-code algorithm could be run to try to decode the barcode 208 in FIG. 2. The optical-code algorithm could be run on the mobile device. After the mobile device ascertains that the barcode 208 cannot be decoded, the mobile device divides the image to create an image segment (e.g., segment 216 or segment 220). An OCR algorithm is then run on the image segment. The OCR algorithm can be run on the mobile device or using a remote device, such as a remote server or a personal computer. Not only does running the OCR algorithm on the image segment take less computation resource than running the OCR algorithm on the entire image, but transmitting the image segment to a remote device does not take as much resources (e.g., bandwidth) as transmitting the entire image.

Figure 3:
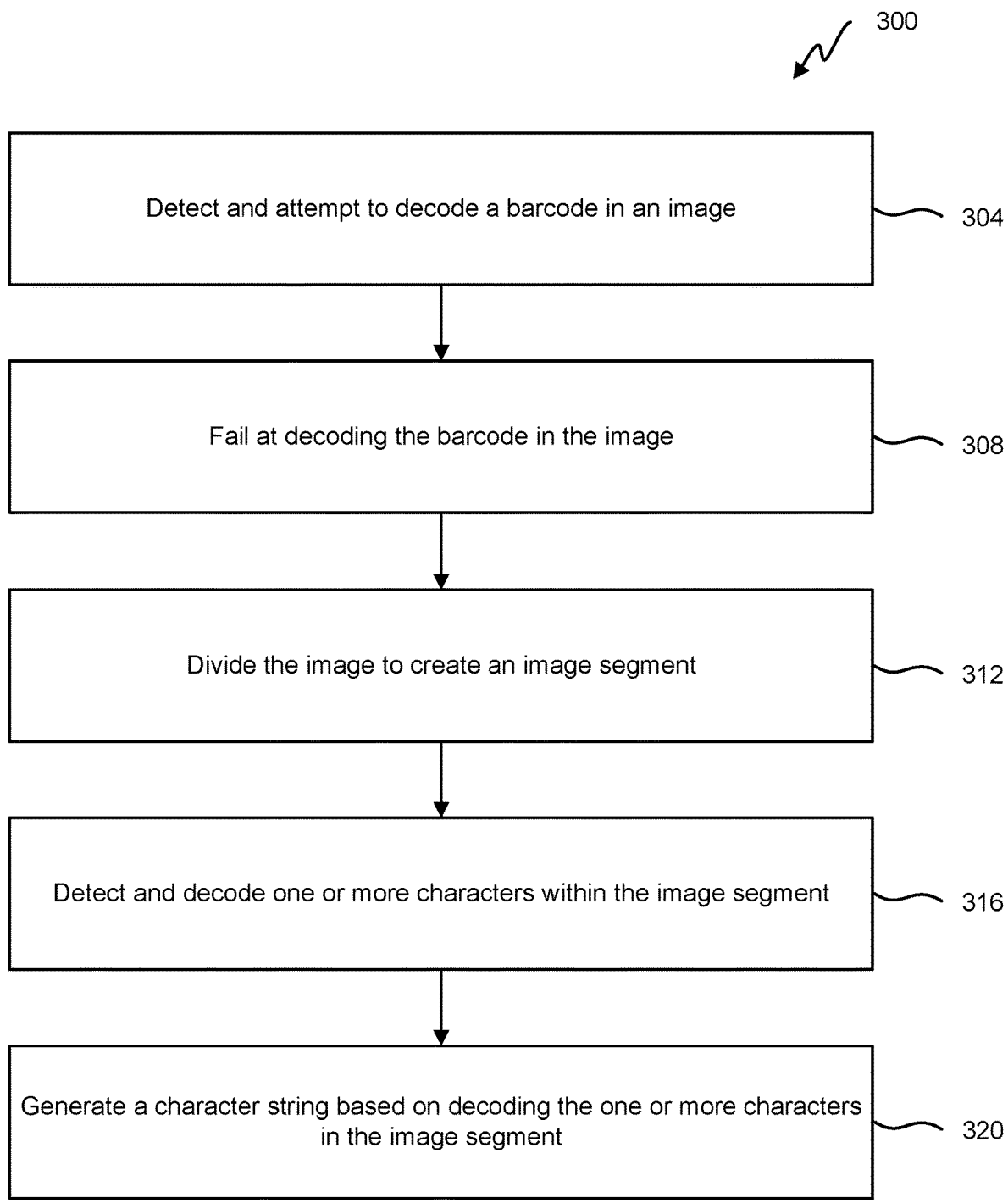
FIG. 3 illustrates a flowchart of an embodiment of a process for image analysis using optical character recognition with barcode detection.

FIG. 3 illustrates a flowchart of an embodiment of a process 300 for image analysis using optical character recognition with barcode detection. In this embodiment, OCR is used as backup to barcode reading. For example, if a barcode is damaged, then OCR is used.

Process 300 begins in step 304 with detecting and attempting to decode a barcode in an image. In some embodiments, step 304 comprises receiving an image acquired by a camera. For example, the image of FIG. 2 is acquired by the system 100 in FIG. 1. The image is analyzed to detect a barcode in the image. For example, the image 202 in FIG. 2 is analyzed to detect the barcode 208. The systems attempts to decode the barcode in the image. For example, the system 100 in FIG. 1 attempts to decode the barcode 208 in FIG. 2.

In step 308, the system fails at decoding the barcode in the image, and the system ascertains that the attempt to decode the barcode failed. For example, a decoding algorithm is run on a portion of the image containing the barcode 208 in FIG. 2, but the system is unable to interpret the barcode 208, or able to decode only a portion of the barcode 208. Thus an area is identified as containing a barcode, but the decoding algorithm cannot decode the barcode 208.

In step 312, the image is divide to create an image segment. For example, the image in FIG. 2 is divided to obtain segment 216 or segment 220. The location and/or size of the image segment is based on a location and/or a size of the barcode (e.g., as discussed in conjunction with FIG. 2).

One or more characters are decoded within the image segment, step 316. The image segment is analyzed to detect the one or more characters. For example, an algorithm is run on segment 220 in FIG. 2 to detect the alphanumeric code 212. If the alphanumeric code 212 is detected, then an OCR algorithm is run on the image segment to decode the alphanumeric code 212. In some embodiments detecting the one or more characters is omitted and the OCR algorithm is run to the image segment.

A character string is generated based on decoding the one or more characters in the image segment. For example, a character string of the VIN is generated after decoding the alphanumeric code 212.

B. Smarter Label Scanning and Barcode Semantics

Figure 4:
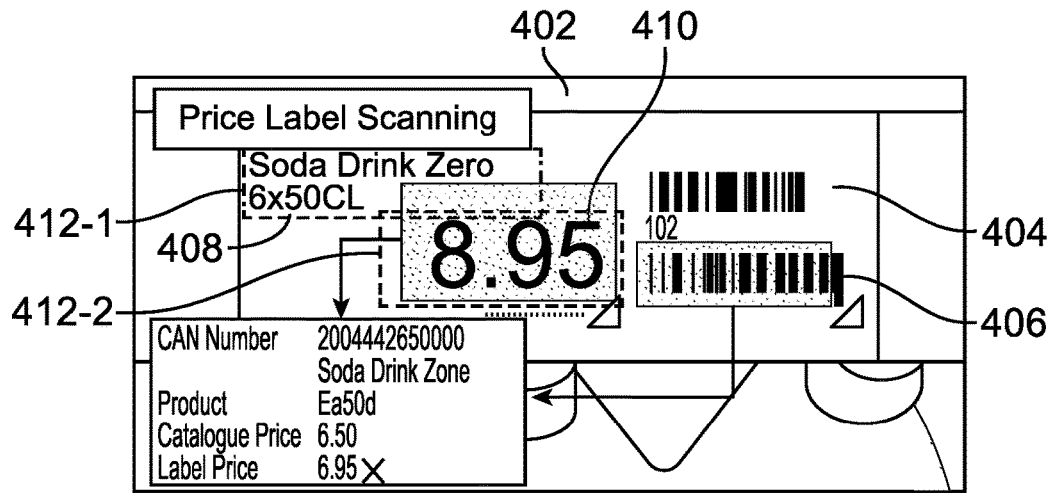
FIG. 4 illustrates examples of optical pattern labels encoding information in multiple formats.
Figure 4:
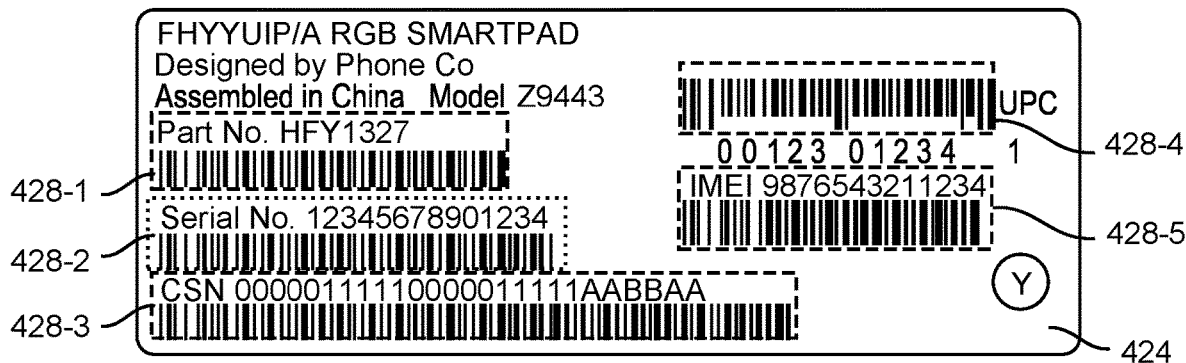
Figure 4:
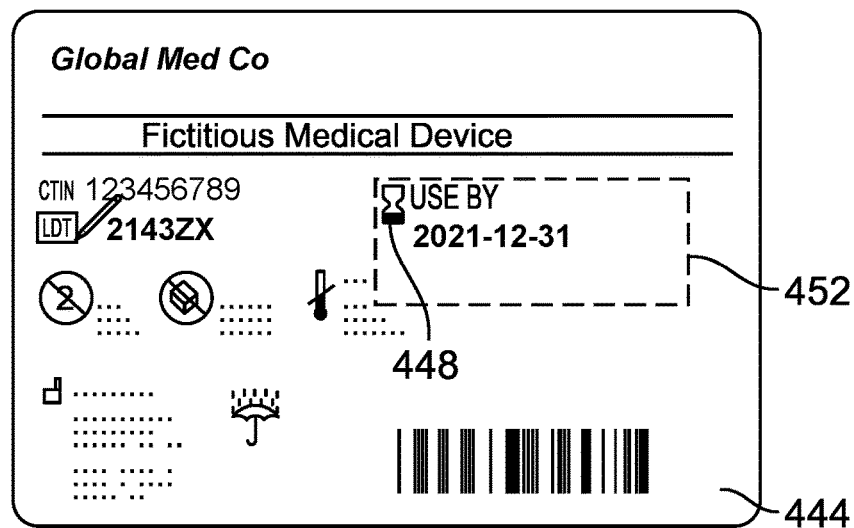

FIG. 4 illustrates examples of optical patterns on labels encoding information in multiple formats, including alphanumeric characters and barcodes. In some embodiments, a system may scan labels that include text fields and barcodes. Scanning may include, but is not limited to, price label scanning. Price labels often contain a barcode, a price, and a text based description of the product. Other examples include shipping labels and product labels, especially labels on packaged consumer goods.

Text and barcode localization and recognition may permit a system to detect and determine meta-data describing a barcode. For example, whether a barcode describes a model number vs a serial number. As an illustrative example, product and shipment labels often use multiple 1D or 2D barcodes to encode relevant information, such as product number, serial number, batch and lot number, and/or expiry date. While there exist standards to encode not only the data but also the semantics of the data (e.g., GS1 AIs, Automotive standards such as VDA, AIAG Odette), labels may omit key-value encoding, relying on human readable strings in the proximity of the barcode to explain the semantics of each individual barcode.

Where a label includes multiple barcodes, manual scanning may include aiming a scanner at a particular barcode (or select it via tapping for camera-based barcode scanning) based on the human readable information on the label. This process may include a learning curve and may be error-prone and time-intensive (e.g., due at least in part to the precision required).

In some embodiments, optical patterns can be assigned a key/label without reading a human readable key because they follow a certain standard format or even particular encoding. Examples include IMEI, UPC, EAN, GS1 AI, HIBCC patterns. Similarly, optical patterns can be assigned a key/label without reading a human readable key because they include a certain prefix (e.g., VDA labels). Where a human readable key is in the vicinity of a barcode, the human readable key may be the closest text string, but the closest text string to the barcode is not always the correct key. Therefore, a system may include some or all barcodes on the label. A system (e.g., an untrained system) may assign to each optical pattern the corresponding key/semantics so that a system may scan the entire label, including optical patterns, and the software application can automatically (e.g., without manual intervention) retrieve the barcode number(s) that are desired for a particular application context, e.g., serial number. In some embodiments, an untrained system is a system that has not seen the particular label layout before (e.g., and infers semantics of the label from barcodes and/or text strings present on the label; different from an approach where a system is explicitly told what each barcode on a label means).

In some embodiments, a system may identify and support a predefined set of key strings, which may get updated over time. Examples of key strings include, but are not limited to serial numbers (e.g., SN, S/N, Serial) and IMEI. In some embodiments, the system may also "label" barcodes for which there are no predefined set of key strings.

FIG. 4 depicts an image 402. The image 402 includes a label 404 comprising a barcode 406, a description 408, and a price 410. The description 408 can be classified as a description because of its position relative to the barcode 406 and/or because it contains multiple lines of text. The price 410 can be classified as the price because of its position relative to the barcode 406 and/or because it is in the largest font. The image 402 is divided to form a first segment 412-1 and a second segment 412-2. The first segment 412-1 is decoded to generate a first character string. The second segment 412-2 is decoded to generate a second character string. The first character string is classified as a description, and the second character string is classified as a price. If only the price 410 is desired, then an OCR algorithm is run on only the second segment 412-2 and not the first segment 412-1, because the first segment 412-1 does not contain characters classified as price.

The barcode 406 is decoded and information about the EAN number, the product, and a catalog price are obtained (e.g., either from the barcode itself or from a database/catalog by matching the EAN number to an entry in the database). The price 410 is decoded using OCR and compared to the catalog price. If the catalog price is different from the price 410 on the label 404, then an error message can be generated to update label 404. Similarly, the description 408 can be compared to a catalog description. Accordingly, barcode information (e.g., catalog price) is combined with and/or compared to OCR information (e.g., price 410). This can be useful for label verification.

In some embodiments, barcode semantics are used to classify a barcode. For example, label 424 comprises five barcodes. If the IMEI was desired to be scanned, the IMEI could be one of five barcodes on label 424. An image of label 424 is segmented into five segments 428, including a first segment 428-1, a second segment 428-2, a third segment 428-3, a fourth segment 428-4, and a fifth segment 428-5, based on locations of barcodes and/or based on information that "IMEI" is above the barcode to be decoded. The system runs an optical character recognition algorithm on the segments 428 to identify which segment contains "IMEI" and returns the fifth segment 428-5 as containing "IMEI." The barcode in the fifth segment 428-5 is then decoded to obtain and/or confirm the IMEI number.

Some may question why the barcode in the fifth segment 428-5 is decoded even though OCR of the fifth segment 428-5 can return a number for the IMEI. The barcode in the fifth segment 428-5 can be decoded for several reasons. For example, OCR usually has little or no error checks, whereas barcodes are usually designed to provide error analysis to confirm the barcode was correctly decoded. Accordingly, OCR of the IMEI number could return a "0" for a "6" or the letter l' for the number "1". Searching for a predefined string using OCR, or a string that is "close enough" (e.g., matched using a Levenshtein distance; or using common error substitutions, such as a number "1" for the letter "I") or has the highest probability of a limited set to match the predefined string, and decoding the barcode to obtain the number, is usually more reliable (e.g., less prone to error) than simply relying on OCR to obtain the number.

In some embodiments, two SKU barcodes are decoded and classified, a promotion is identified (e.g., by color of label), a type of promotion is identified (e.g., final clearance by a star on the label or the last two digits of a price being a certain number, such as "97"), and/or price is identified. Thus a label can be detected and recognized (e.g., the label is the anchor), and then multiple objects on the label are decoded (e.g., either by OCR or barcode algorithm, by searching for objects in well-defined spots, font size, font color, etc.).

In FIG. 4, a label 444 is shown. A symbol 448 is on the label 444. The symbol is of an hourglass. To read an expiration date on the label 444, the label 444 is scanned to search for the symbol 448. In some embodiments, the symbol 448 is not a barcode or character (e.g., not found on a standard computer keyboard). An image of the label 444 is then divided to obtain segment 452. A position of segment 452 in the image is configured so that the symbol 448 is in an upper, left-hand portion of segment 452. An OCR algorithm is then run in the segment 452 to obtain a date. For example, "2016-09-11" is obtained. The text "USE BY" in segment 452 can be used to confirm the segment is in the correct location of the image, and/or the text "USE BY" is simply ignored/discarded.

In some embodiments, semantics are ascertained by decoding a barcode and comparing barcode content with OCR data. In the example described above with label 424, the system is configured to associate text above a barcode with the barcode. However, in some embodiments, a system may not know which text is associated with which barcode. For example, it might be challenging for a system to ascertain whether the barcode above or the barcode below "Serial No." on label 424 is associated with the serial number (e.g., since the system might not know if accompanying texts are situated above or below the barcodes; which is something that might vary for different label types). For example, the accompanying text to the barcode shown in the second segment 428-2 could by "Serial No." or "CSN." To ascertain which text is associated with a barcode, a barcode is decoded and a line of text (or multiple lines of text) is read (e.g., "Serial No. 12345678901234"). A first part of the text (e.g., "Serial No."; ascertained by dividing the text into a first string of letters and a second string of numbers) is used to find out the semantics. A second part (e.g., "12345678901234"; the second string) is used to match the text to a barcode, since the content of the barcode should also be "12345678901234." In some embodiments, the barcode is decoded, even though the numbers "12345678901234" can be obtained by optical character recognition because some of the decoded text might include some wrongly read characters. Accordingly, matching the second part of the text to the barcode content is performed using an approximation. For example, a Levenshtein distance between the content of the barcode and the second part of the text could be used. In another example, the system counts a first number of digits in the content of the barcode, counts a second number of digits in the second part of the text, and compares the first number of digits to the second number of digits. Since "Part No.", "Serial No.", and "CSN" on label 424 have different numbers of digits, text can be efficiently associated with barcodes based on a number of digits in the text, or in a part of the text.

C. Smarter Product Label Scanning

With capabilities in text recognition, text localization, label localization, and/or optical pattern scanning, more complex embodiments can be enabled, which can include both localizing and scanning specific text fields as well as optical patterns and also incorporate vertical specific data format standards (e.g., on medical device labels). In some embodiments, a system may scan data from multi barcode labels (e.g., electronic devices+packages, medical devices, or asset tracking labels).

Figure 5:
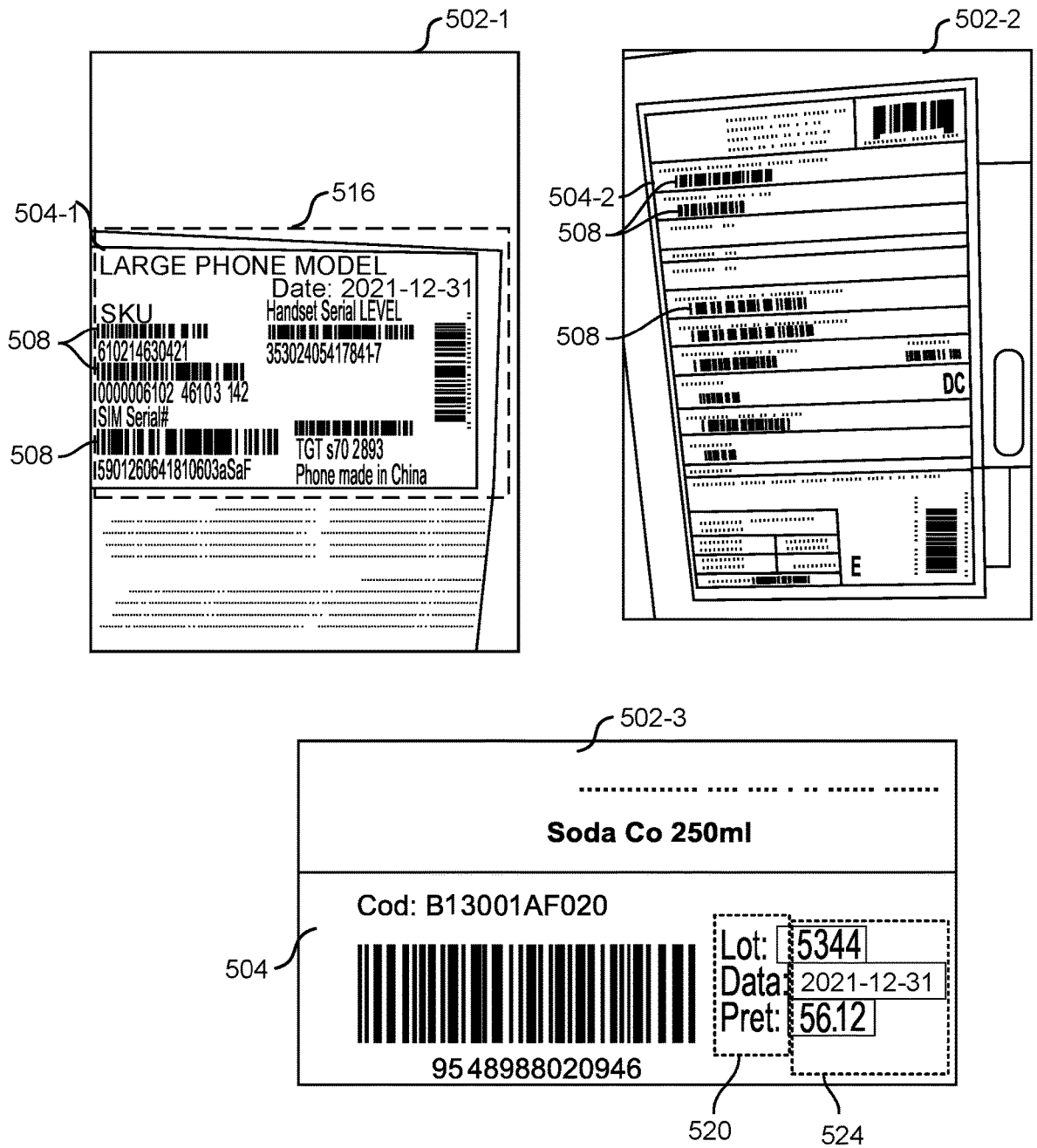
FIG. 5 illustrates exemplary labels for scanning, in accordance with some embodiments.

FIG. 5 illustrates images 502 of exemplary labels 504 for scanning. Some platforms may scan multiple barcodes without knowing the specific characteristics to uniquely identify a semantic of the barcode (e.g., SKU vs serial number), serial number, lot number, batch number, manufacturing date, or expiry date, which may be printed as text but not encoded in an optical code. Often, information is limited to a single line or a single word. The system (e.g., system 100 in FIG. 1) may augment a) existing barcode scanners with the capability to scan multiple barcodes at once; b) existing OCR capabilities; and/or c) technological components that combine OCR+barcode scanning for scanning price labels in retail stores. In some embodiments, labels 504 may be scanned in conditions without a reliable internet connection (e.g., some embodiments run on a user's device and/or transmit data to a local device using Bluetooth or near field communication).

Applicant has observed that in certain situations, scanning a particular barcode can be challenging. For example, FIG. 5 shows a first image 502-1 and a second image 502-2. The first image 502-1 is of a first label 504-1. The second image 502-2 is of a second label 504-2. Both the first label 504-1 and the second label 504-2 each comprise several barcodes 508.

The first image 502-1 is of a phone box. When a phone is sold, the retail agent scans the barcode of a serial number of the phone for purchase. However, with multiple barcodes, some image-based, barcode scanning software is not able to correctly identify which barcode is the particular barcode that relates to the serial number.

In some embodiments, to identify a particular barcode, the system decodes each barcode 508 in an image 502, or portion of an image (e.g., an image segment). For example, the first image 502-1 is divided to create a segment 516, which includes the first label 504-1. Each barcode within the first segment 516 is decoded to produce a plurality of scan results. The plurality of scan results are then compared to UPC codes to identify which UPC codes are used. The scan result that is a UPC code that matches a UPC code for a serial number is selected (e.g., based on symbology and/or length of the serial number). If the product is not known, the screen freezes and the user can select the serial number from undefined barcodes scanned.

However, if there is more than one barcode per type of barcode, then a scanning result can still be ambiguous using the method in the paragraph above. For example, a barcode for an International Mobile Equipment Identity (IMEI) can be a code 128 barcode. However, code 128 barcodes are used in many applications, including other IMEI barcodes (e.g., see also Wikipedia, Code 128, available at: https://en.wikipedia.org/wiki/Code_128). Accordingly, there can be other code 128 barcodes on a package.

To select a particular barcode from multiple of the same type (e.g., to select an IMEI number from multiple code 128 barcodes in an image), each barcode of the same type (e.g., of a particular type, such as code 128 barcodes), are tracked and scanned (e.g., using techniques as disclosed in commonly owned U.S. patent application Ser. No. 17/244,251, filed on Apr. 29, 2021, which is incorporated by reference for all purposes). Other optical patterns are ignored. The system determines the barcode that is to be scanned based on a position of the barcode (e.g., IMEI1 is above IMEI2) and not just barcode type (e.g., symbology and/or length). In some applications, some phones have multiple IMEI numbers (dual-sim phones), and the user would like to automate scanning the correct one (based on the UPC code of the phone). In some configurations, an application allows a user to create capture patterns which are bound to specific UPC/EAN barcode values. Based on the UPC/EAN code it is decided which of the multiple IMEI barcodes (Code 128) is used to fill the IMEI1 field.

In some embodiments, an implementation of a mobile-device app comprises one or more of: scanning each barcode in an image; identifying UPC/EAN codes; if UPC/EAN is identified, scan relevant IMEI and display result, with or without displaying the serial number of the device as well. If the UPC/EAN is not identified and only one IMEI code is found, then app requests the user to confirm that the device is single-IMEI device, and save this information accordingly; if UPC/EAN is not identified and multiple IMEI are found, then the app can freeze an image on the screen and/or request the user to select an IMEI; The IMEI is saved (e.g., by sorting both IMEI+UPC on X and Y axis and save index of selected barcode).

In some embodiments, a barcode semantics solution is implemented. A barcode semantics feature label capture can be used to automatically scan the correct barcode without having to maintain templates (e.g., relations between barcodes). In some configurations, semantic type is looking for a specific type of character. For example, optical character recognition is run on fields near barcodes to identify the characters (e.g., identifying "IMEI" and matching a barcode to the characters).

It is possible to define a label capture template that specifies required and optional fields (e.g., UPC, IMEI1, and IMEI2) and how they can be identified. For example, a label contains four code 128 barcodes with different semantics: an EID code, an IMEI2 code, a serial number, and an IMEI/IMEID code. The EID code and the serial number could be required, and the IMEI2 code and the IMEI/IMEID code could be optional. In some embodiments, a global barcode semantics field is not used and a name of a barcode is derived based on recognizing text near a barcode.

In some embodiments, an implementation of a mobile-device app using barcode semantics comprises: scan all barcodes, pick UPC/EAN; if UPC/EAN is known, scan relevant IMEI and display result (no serial number shown); if UPC/EAN is unknown, use barcode semantics to identify IMEI 1 (and IMEI 2 to exclude it); save selected IMEI (e.g., by sorting both IMEI+UPC on X and Y axis and save index of selected barcode). In some embodiments, a user is requested to confirm that the right barcode has been identified (e.g., by displaying an icon over the barcode on a display of a mobile device).

Semantic scanning can be used where there is a barcode and a letter combination associated with the barcode. For example, the letter combination could be "serial", "ISBN", "IMF", "sim", etc. The letter combination tells the system what the barcode is. This can be used to create a template and/or to classify a barcode.

As an example, the first image 502-1 is acquired by a camera of a mobile device. The image is cropped to the segment 516. Barcodes 508 in the segment are detected and the segment 516 is further subdivided into secondary segments, with one secondary segment per barcode 508. For example, segments 428 in FIG. 4 could be secondary segments. OCR is run on the secondary segments to obtain barcode identifiers. One or more barcodes are decoded and matched (e.g., correlated) with a barcode identifier (e.g., based on proximity of text to a barcode). Table 1 below provides a sample matching between barcode identifiers, obtained using OCR, and strings obtained by decoding barcodes 508 in the first image 502-1.

TABLE 1

Matching OCR fields with barcodes

| Barcode identifiers (OCR) | Strings (from barcodes) |
|---|---|
| SKU | 610214630421 |
| Sim Serial | 8004360561510603858 |
| IMEI | 353914054176312 |
| TGT | 170-7663 |

Barcode identifiers are obtained by optical character recognition. Strings are obtained by decoding a barcode. Barcode identifiers are associated (e.g., linked) with strings based on proximity. This technique can work particularly well for highly structured labels (e.g., where the barcode identifier is known in relation to the barcode). Dividing the image to define segments is sometimes referred to as segmentation or text localization.

In another example, OCR can be used twice, first to locate identifiers, and then second to decode text. For example, FIG. 5 shows a third label 502-3. The third label 502-3 includes three identifiers 520, "Lot", "Date", and "Pret"; and the third label 502-3 includes three values 524, "3445" corresponding to Lot, "24.06.2019" corresponding to Date, and "12.56" corresponding to Pret. A barcode is detected. A first segmentation of the image of the third label 502-3 to the right of the barcode in made because it is known that identifiers are to the right of the barcode. A first OCR algorithm is run to locate the identifiers 520. The image is then segmented a second time based on locations of the three identifiers (e.g., further segmented into three secondary segments; one to the right of Lot, one to the right of Date, and one to the right of Pret). A second OCR is run on each of the secondary segments to generate strings that are associated with the identifiers, as given in Table 2 below.

TABLE 2

Matching OCR fields with other text

| Identifiers (OCR) | Strings (from text) |
|---|---|
| Lot | 3445 |
| Date | 24062019 |
| Pret | 12.56 |

In some embodiments, a method for decoding information on a label comprises: acquiring an image of the label wherein the label contains alphanumeric characters and one or more barcodes; decoding the one or more barcodes; performing optical character recognition on the alphanumeric characters of the label; analyzing positions of the alphanumeric characters relative to the one or more barcodes; correlating the alphanumeric characters with the one or more barcodes (e.g., as shown in Table 1 above); and reporting the alphanumeric characters correlated with the one or more barcodes.

Figure 6:
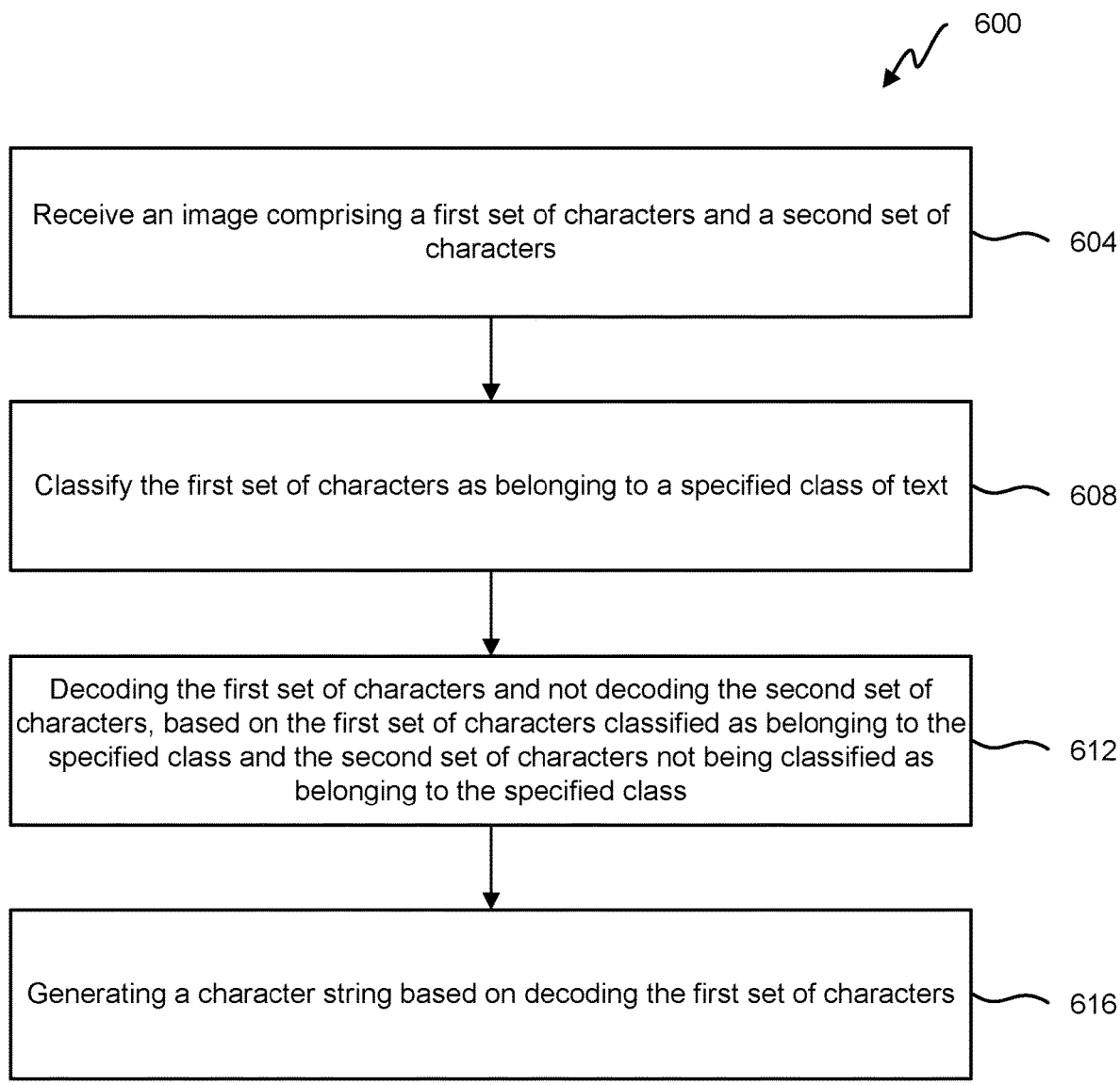
FIG. 6 illustrates a flowchart of an embodiment of a process for image analysis using text classification for optical character recognition.

FIG. 6 illustrates a flowchart of an embodiment of a process 600 for image analysis using text classification for optical character recognition. In some embodiments, text is classified before running optical character recognition. In some configurations, an image is segmented before classification and/or during classification. Classification can be based on features of text (e.g., largest text within a segment is classified as price). In some embodiments, machine learning is used for classification (e.g., to identify price labels).

Process 600 begins in step 604 with receiving an image comprising a first set of characters and a second set of characters (e.g., price 410 and description 408 in FIG. 4. The image is acquired by a camera (e.g., from a camera of a mobile device).

In step 608, at least a portion of the image (e.g., one or more image segments or an entire image) are analyzed to classify the first set of characters as belonging to a specified class of text, wherein the specified class is predefined (e.g., serial number, price, description, SKU, model number, etc.).

In step 612, the first set of characters are decoded and the second set of characters are not decoded, based on the first set of characters classified as belonging to the specified class and the second set of characters not being classified as belonging to the specified class. In some embodiments, the second set of characters are decoded based on the first set of characters classified as belonging to the specified class (e.g., values 524 are decoded based on identifiers 520 being located and classified).

A character string is generated based on decoding the first set of characters. The character string can then be saved and/or transmitted (e.g., to a local device or a remote server).

In some embodiments, the process 600 further comprises analyzing the image to detect a feature, wherein detecting the feature is based on machine learning; dividing the image to create an image segment, where the image segment is based on a location of the feature in the image; the portion of the image is the image segment; classifying text, based on features of text. (e.g., largest size within a segment); using machine learning for classification (e.g., identify price labels); and/or analyzing the second set of characters to classify the second set of characters as belonging to a second specified class of text, wherein the second specified class is predefined.

In some configurations, classification includes price (e.g., the largest text is picked), description, and/or serial number. A robot can be used to acquire images (e.g., of a retail shelf), do label detection (e.g., from a trained AI); segment the image into labels; classify product description, price (e.g., to the right, large font); identify the label as a promotion label (e.g., by color of label; on bottom of label text specifying "clearance" or "special"); identify a date the promotion is to expire, the promotion date; compare the promotion date to the current date; and/or flag promotion dates that are expired. This can be used to flag labels that need replaced.

D. Shipping Label Scanning

Figure 7:
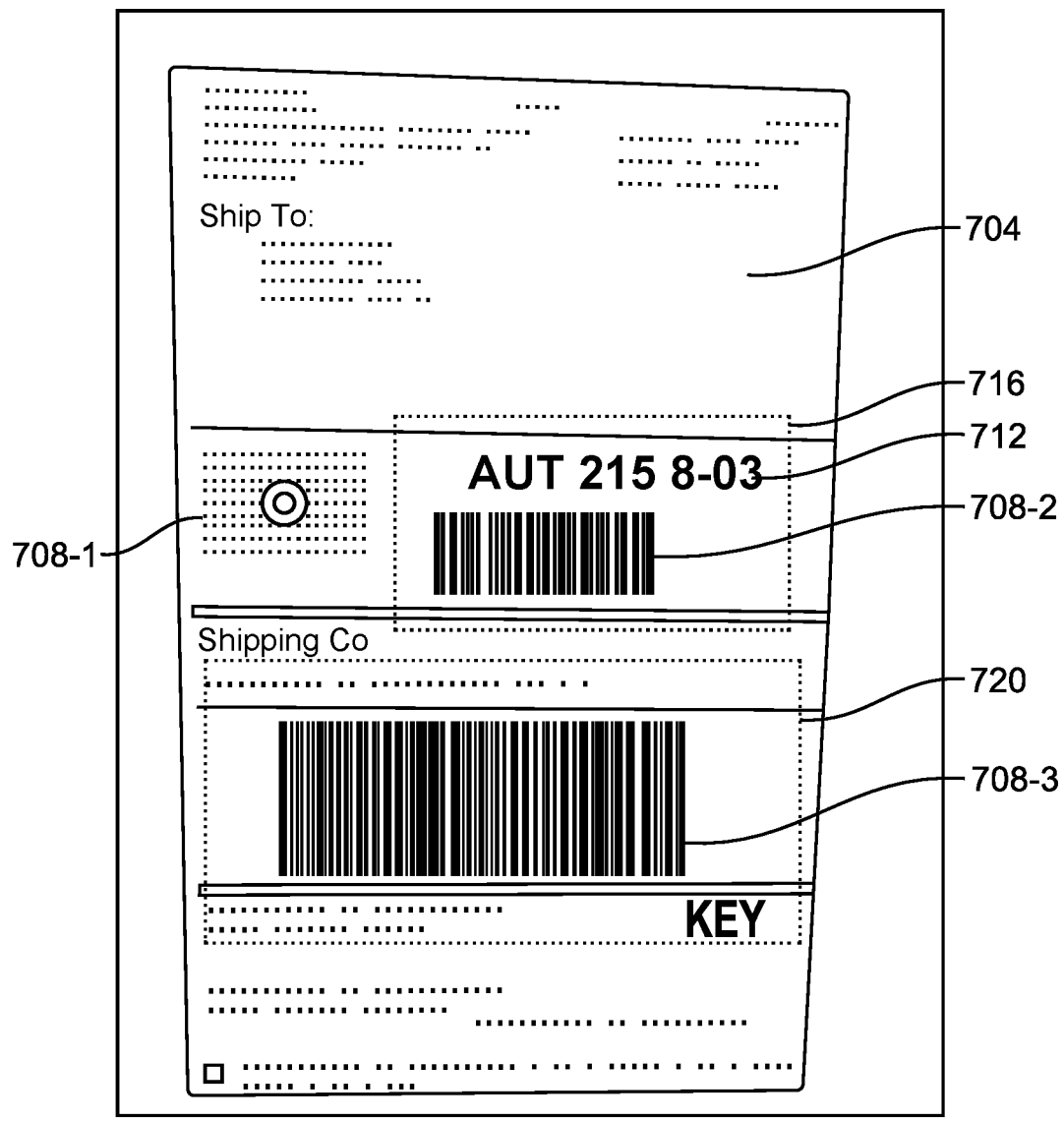
FIG. 7 illustrates exemplary shipping labels in multiple structures and information formats, according to some embodiments.

FIG. 7 illustrates exemplary shipping labels in multiple structures and information formats. In some embodiments, a shipping label could be scanned and decoded without manual configuration of the label geometry, and may permit data to be scanned from shipping labels beyond what is encoded in standardized optical patterns (e.g., GS1 barcodes). Data may be captured from labels on inbound parcels or other deliveries where electronic data interchange (EDI) information is missing or doesn't cover a logistic provider. With typical OCR and optical pattern scanning technology, scanning may not be feasible due to variability in shipping labels between different logistic providers, incomplete syntax, and structure information for unrecognized labels. For example, some data may be provided only in alphanumeric form (e.g., mailing addresses), making it more important to read some text using OCR. In some embodiments, a system may include: (i) a barcode scanner with the capability to scan multiple barcodes at once; (ii) OCR capabilities; and/or (iii) technological components that combine OCR and barcode scanning. As shipping labels are often scanned in conditions without reliable internet, a system may implement label scanning on a device, rather than as a cloud application.

In FIG. 7, label 704 comprises a first barcode 708-1, a second barcode 708-2, a third barcode 708-3, and a character code 712. In some embodiments, the system detects the barcodes 708 on label 704 and selects the largest barcode to decode (e.g., the third barcode 708-3); the other barcodes (the first barcode 708-1 and the second barcode 708-2 are not decoded). In some configurations, the barcodes 708 are detected and categorized (e.g., one-dimensional or two-dimensional; or type, such as code 128), and then one or more barcodes 708 are decoded (e.g., the two-dimensional barcode, the largest one-dimensional barcode, or the smallest one-dimensional barcode).

In some embodiments, a first code is used as an anchor for a second code. For example, the first barcode 708-1 could serve as an anchor to decode another code. For example, detecting the location of a two-dimensional barcode (the first barcode 708-1) could be used to divide an image of the label 704 to define segment 716. An OCR algorithm and/or barcode decoding algorithm are then run on the segment 716. Thus the first barcode 708-1 can be used as an anchor for the second barcode 708-2 or the character code 712. In some configurations, two codes are used as an anchor for a third. For example, detecting the location of the first barcode 708-1 and the second barcode 708-2, and identifying the first barcode 708-1 as a two-dimensional barcode and the second barcode 708-2 as a one-dimensional barcode, can provide position and/or size information to define segment 720. In some configurations an outline of the label 704 is also used to provide position data for segmenting an image. Using geometry of the label (e.g., the label outline and/or detected features on the label, such as barcodes, symbols, and characters) can provide information about how to segment an image. An OCR algorithm and/or a barcode decoding algorithm can then be run on the segment. Segments can help to reduce computational complexity, and segments can also be used while classifying and/or matching decoded strings to labels.

In some configurations, an address is localized (e.g., using an anchor). For example, the receiver address ("SHIP TO" on label 704) is localized based on being above the first barcode 708-1. The sender address can also be localized and/or differentiated from the receiver address.

E. Other OCR Capabilities

Figure 8:
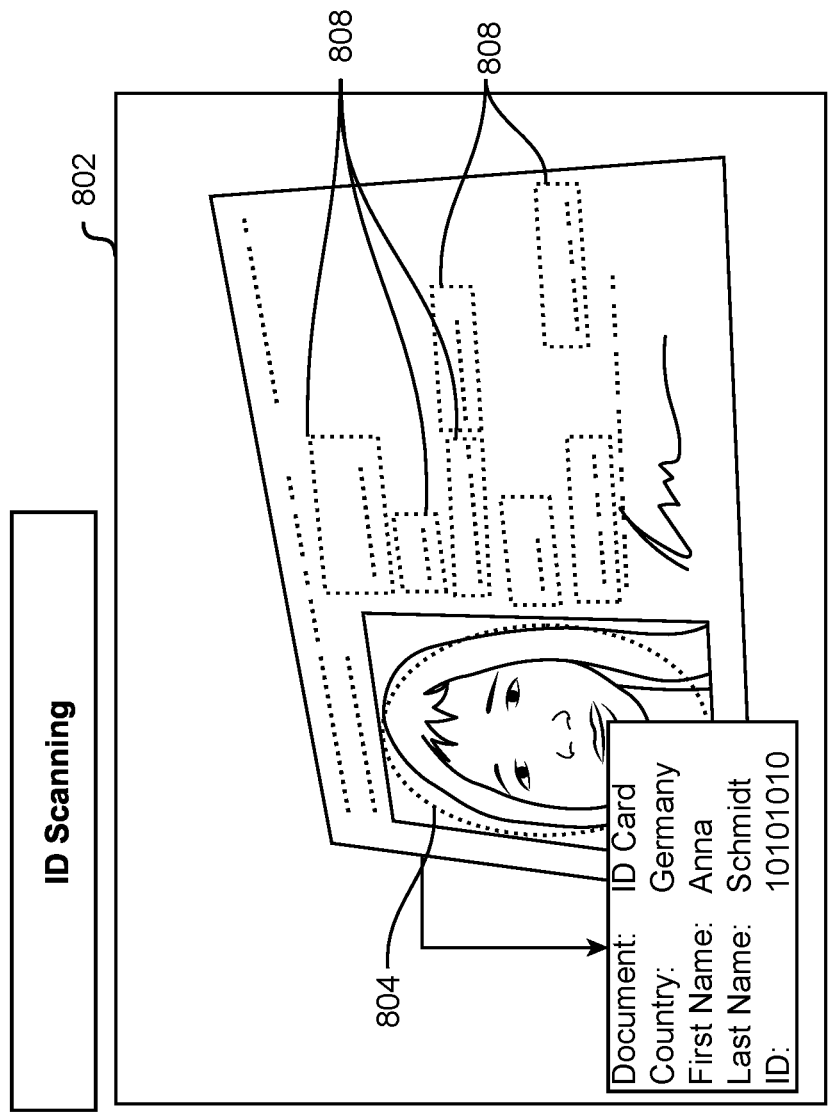
FIG. 8 illustrates example cases where a system may be configured for use-case specific scanning combining OCR and optical pattern scanning.

FIG. 8 illustrates cases where a system may be configured for use-case specific scanning combining OCR and optical pattern scanning. Use-case specific OCR may improve the following use cases of OCR: (i) REF/LOT/Expiry marks as part of medical device labels (UDI) in healthcare (as an application of smarter label scanning); (ii) Identify REF/LOT Fields as specified in UDI and parse barcodes present; (iii) Serial or Batch Number scanning (standalone or as part of Smarter Product Label Scanning); (iv) Retail: Expiry date scanning (with or without combination of barcode scanning); (v) VIN Number Scanning; and (vi) Credit Card Scanning.

In some embodiments, Credit Card Scanning includes scanning data on the front of credit and debit cards for faster data entry. Credit card scanning may be applied to business to client payment applications (ecommerce/mobile shopping or self-scanning with payment). In some embodiments, it may be used for business to enterprise payment in physical retail, especially for queue busting (describing a retail approach of scanning items while customers are waiting in line to improve the retail experience). A goal is to speed up data entry, potentially including an image of the card where required.

In some embodiments, a system may allow for entry of credit card data (native or web) through an automatic scan of the card. The system may collect data in two ways: (i) by using a user interface (UI) provided by the payment provider, some of these directly send the payment request to the payment processor; and/or (ii) returning the data to the app itself, which would send the collected data in a second step to the payment processor. Some of these UIs also include card scanning with the camera. Solutions where the payment details are passed to the app before transmission to the payment processor can be extended with a card scanning solution such as an alternative route before sending the data to the payment processor.

In some embodiments, facial recognition is used as an anchor for OCR. For example, in image 802, facial recognition is used to identify a face position 804. Size and/or locations of segments 808 are based on the face position 804.

F. Flexible Pipeline

Figure 9:
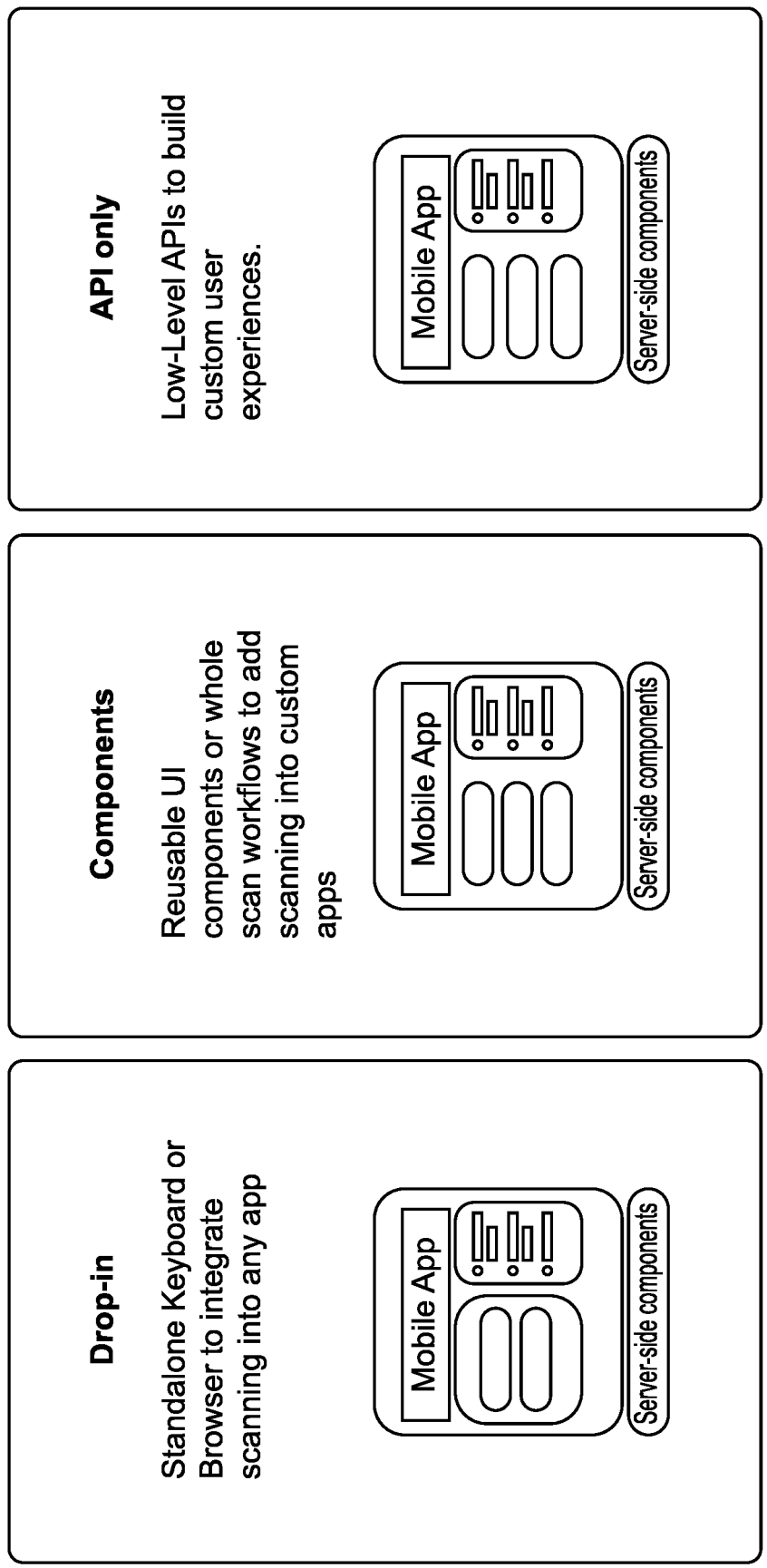
FIG. 9 illustrates various approaches to integration of OCR-optical pattern scanning, in accordance with some embodiments.

FIG. 9 illustrates various approaches to integration of OCR-optical pattern scanning in accordance with various embodiments. In some embodiments, a keyboard wedge scan engine is used to interface with fillable form documents and/or database files to enter credit card information. Credit card scanning may include, but is not limited to, applications in the following areas: (i) B2C, where credit card scanning could be a complimentary offering to existing barcode offerings; (ii) B2E, e.g., Airlines: credit card scanning helps lower costs for B2E scanning and allow them to replace the existing additional hardware; and/or (iii) retail, potential opportunities for multiple points of sail or queue busting.

Figure 10:
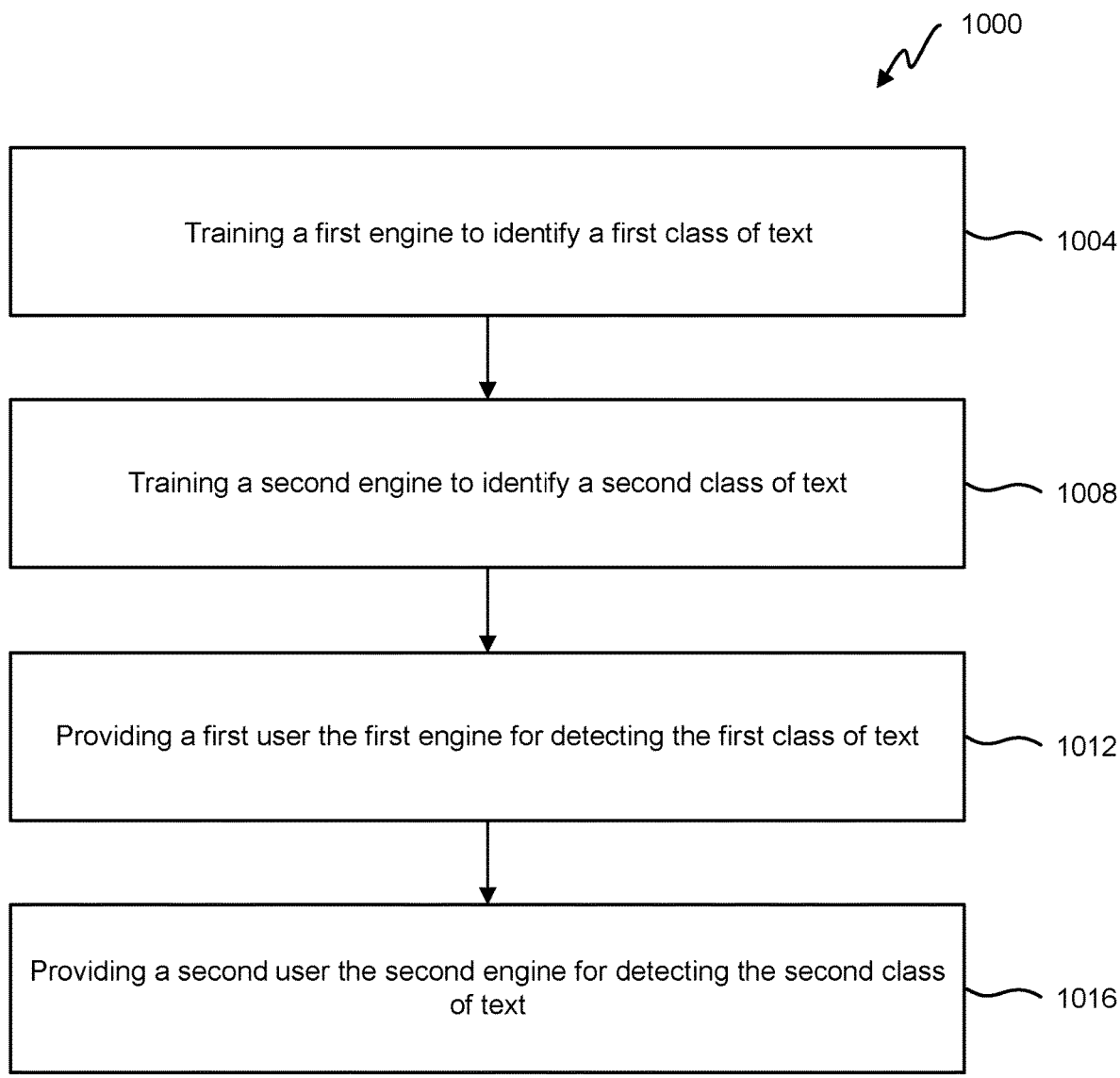
FIG. 10 illustrates a flowchart of an embodiment of a process for image analysis using a flexible pipeline.

FIG. 10 illustrates a flowchart of an embodiment of a process 1000 for image analysis using a flexible pipeline. A flexible pipeline can be used to create an engine to customize what is detected and/or classified in an image.

The process 1000 begins in step 1004 with training a first engine to identify a first class of text. A second engine is trained to classify a second class of text, step 1008. A first user is provided the first engine for detecting the first class of text, step 1012. A second user is provided the second engine for detecting the second class of text, step 1016.

G. Rail Reporting Marks

Figure 11:
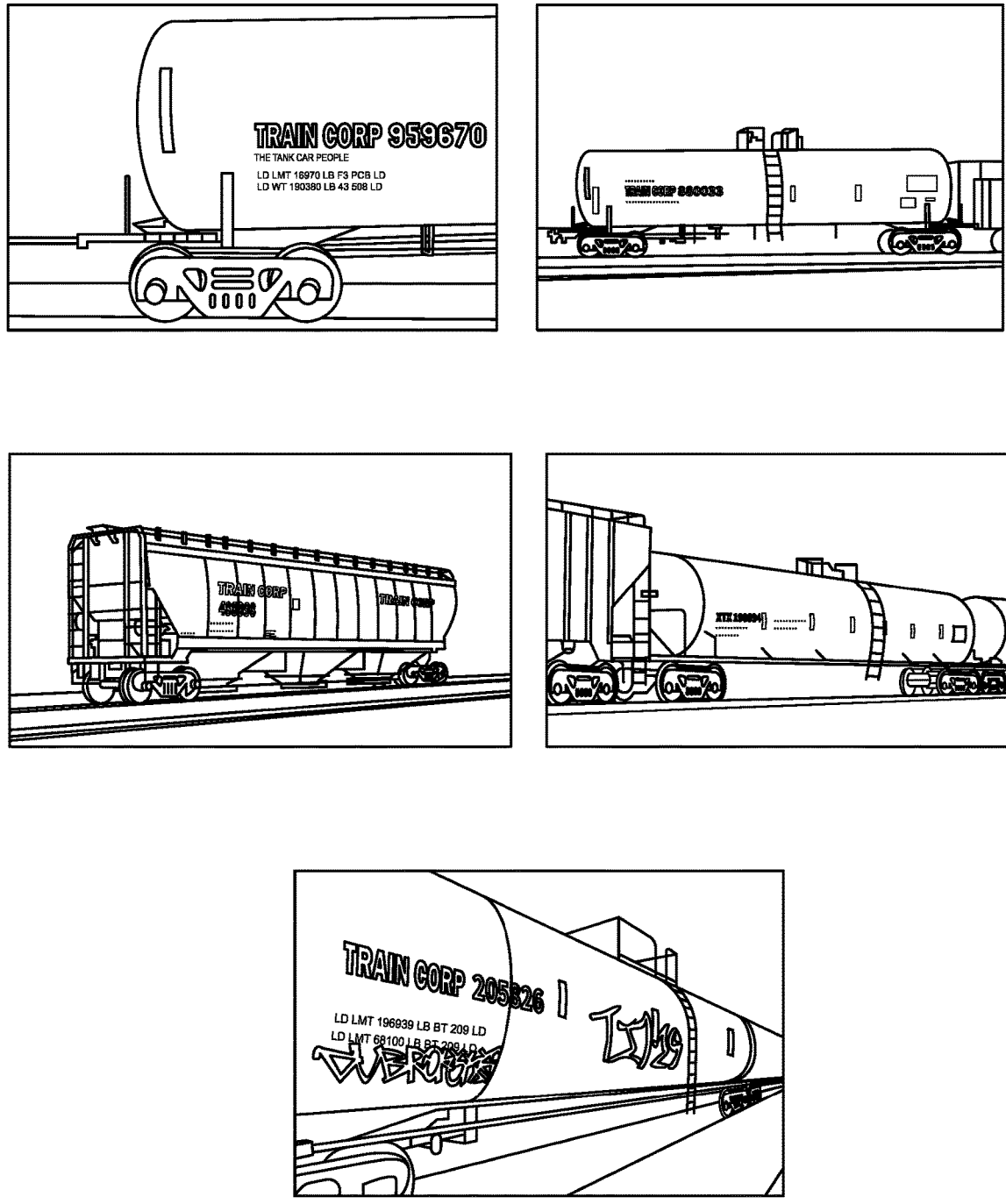
FIG. 11 illustrates example reporting marks on rail stock.

FIG. 11 illustrates exemplary reporting marks on rail stock. Rolling stock (e.g., a railcar) in the United States is marked with unique identifiers called reporting marks. Reporting marks may include an alphabetic code of one to four letters and are typically painted or stenciled on each piece of rolling stock, along with a one- to six-digit number. Reporting marks uniquely identify an individual railcar, and are used to track the locations and movements by the railroad the railcars are traveling on. The railroad shares the information with other railroads and customers and/or various types of maintenance or repair processes. Reporting marks are typically printed in a large font on the side of the railcar and can usually be easily read from multiple meters away.

Reporting mark numbers can be recorded by manual entry, which is cumbersome and error prone. However, scanning reporting marks poses significant challenges for automation. For example, fonts vary between different railcars (e.g., compare "BNSF" in a first image 1104-1 to "BNSF" in a second image 1104-2). Rolling stock may be mixed in a single train. Furthermore, the orientation and layout of the reporting marks may vary, where some railway companies have the reporting marks on a single line, while others print them on two separate lines. Furthermore, as many as hundreds of different reporting marks are in use in the United States. Graffiti can be painted on a railcar, sometimes hiding the name and/or numbers partially. Font changes between the characters and welding lines can be additional challenges.

In some embodiments, a system permits a user to scan marks on a railcar from a reasonable distance (e.g., 3-10 meters) and automatically recognize the train reporting mark without manual data entry. A system may recognize the text on a partial area of the image (the "aimer"), which is not more than 200% of the size of the text in some embodiments. This partial area can contain both two-line marks as well as a longer single-line mark. In some embodiments, the railway mark can be considered fixed to 4 letters. In some embodiments, strong angles are supported, where strong angles may describe a relative perspective such that the text is significantly skewed. In this way, a system may recognize as many as 80-90 percent or more of the reporting marks encountered by the user. For example, the system is capable of recognizing as many as 95% or more of the human readable markings (e.g., using techniques explained and/or referenced herein).

In some embodiments, a system is configured to identify the markings in a full uncropped video frame ("localization") to allow automatic scanning. The capability could be implemented on an iOS or Android app or an SDK. In some embodiments, this permits a user to record rolling stock in a moving train, as opposed to manually registering every railcar at every stop, delivery, and/or safety check. As an illustrative example, manual safety checks or other registrations of a tanker that include manual data entry may take place as many as eight times a day.

Figure 12:
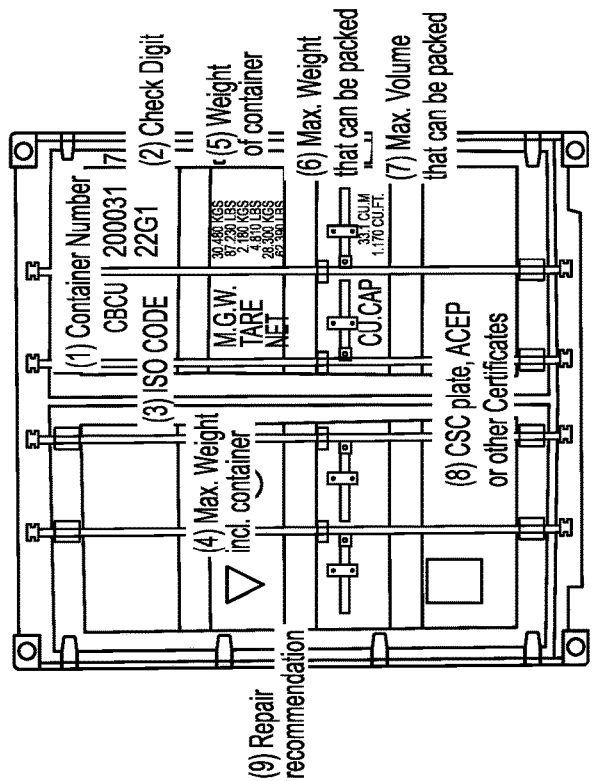
FIG. 12 illustrates examples of numbering systems on rolling stock and shipping containers.
Figure 12:
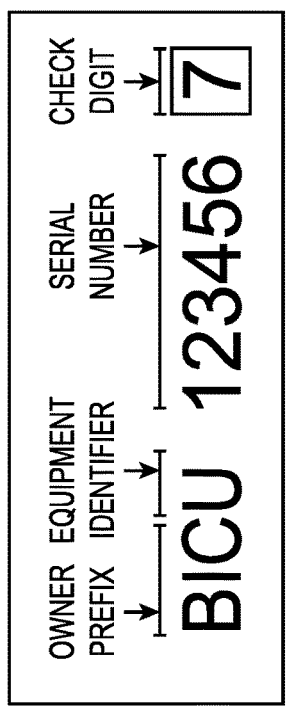
Figure 12:
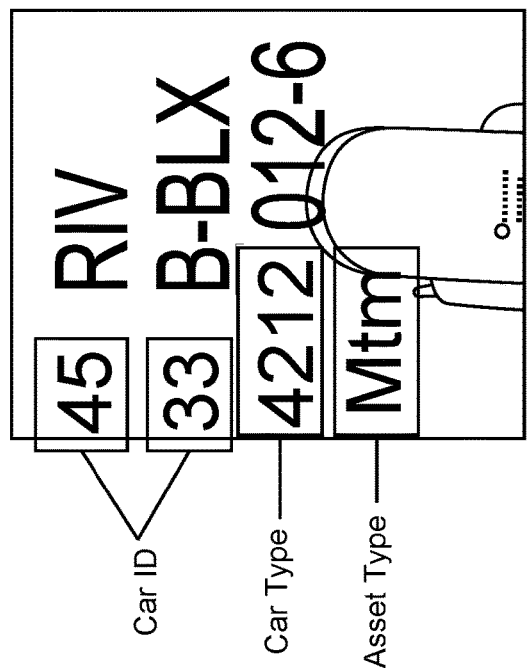

FIG. 12 illustrates other numbering systems on rolling stock and shipping containers. In such system, markings may be more complicated and/or smaller, and a system may be configured to scan markings and identify data types and data values. For example, a system may scan marking a letter identifier printed on the car to the identification number of an IoT devices that is being attached to the rail car. In other words, the scanning is used to associate two identification numbers associated with the car to commission the IoT device. In some embodiments, an IoT device is an RFID tag, a GPS tracker, some form of RF device, or an optical identifier. In another example, the shipping container numbering system standard BIC (international container bureau) may be scanned by a system implementing optical pattern scanning with OCR.

Figure 13:
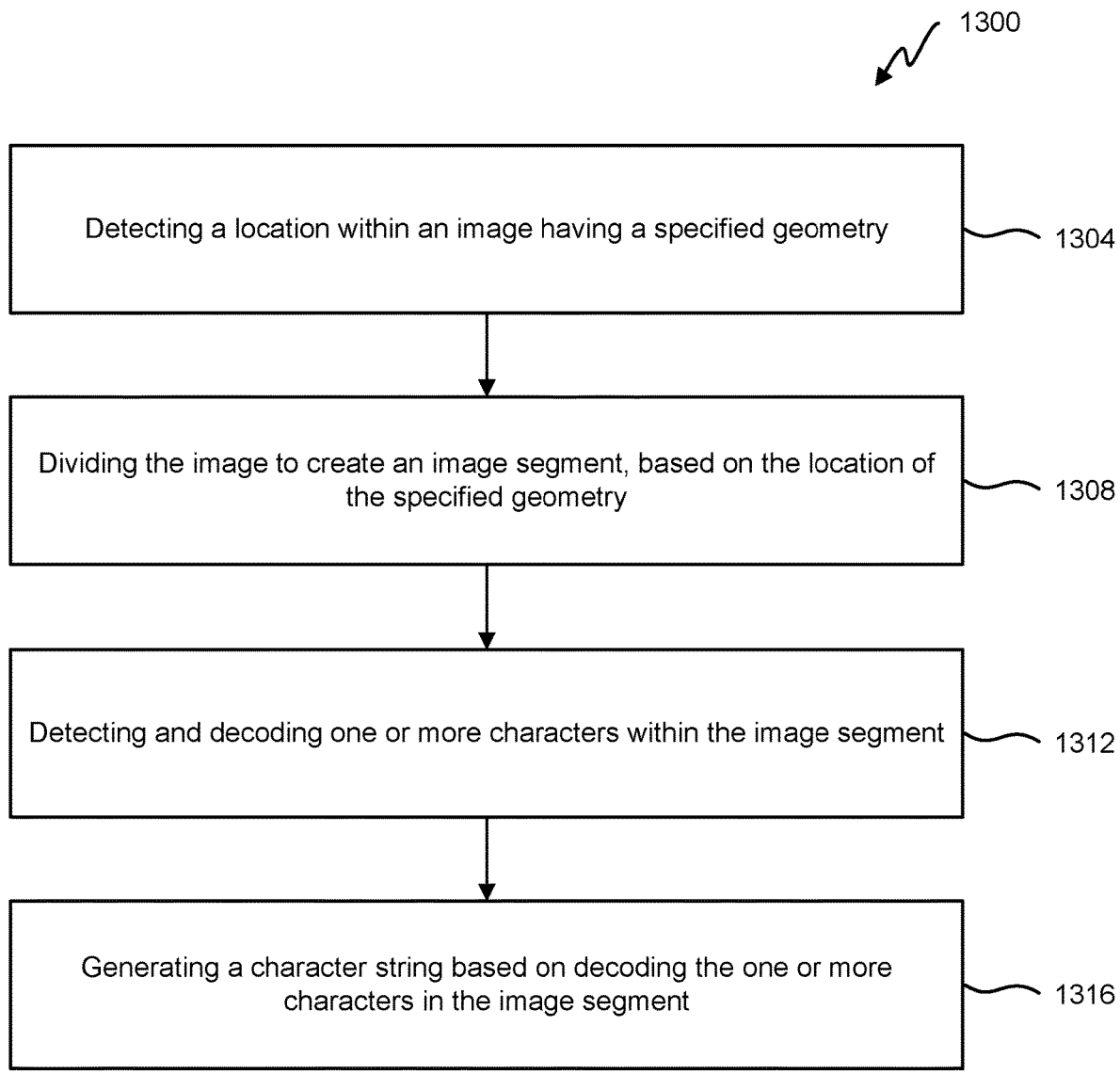
FIG. 13 illustrates a flowchart of an embodiment of a process for image analysis using visual geometry as an anchor for optical character recognition.

FIG. 13 illustrates a flowchart of an embodiment of a process 1300 for image analysis using visual geometry as an anchor for optical character recognition. Visual geometry in an image can be used as an anchor point for selecting an area of the image (e.g., one or more segments of the image).

The process 1300 begins in step 1304 with detecting a location within an image having a specified geometry. The image, acquired by a camera, is received by the system. The image is analyzed to detect a location within the image having a specified geometry. The specified geometry is a predefined, visual geometry. For example, the specified geometry could be a one-dimensional or two-dimensional barcode (e.g., an arrangement of rectangles, such as squares or parallel lines), a specified class of barcodes, or a label.

In step 1308, the image is divided to create an image segment. The image segment is based on the location of the specified geometry. For example, the image segment could be based on geometry of label 704 and/or a position of a barcode 708 as described in FIG. 7.

In step 1312, one or more characters within the image segment are detected and/or decoded. The image segment is analyzed to detect the one or more characters within the image segment, and the one or more characters in the image segment are decoded. For example, an optical character recognition algorithm is run on the image segment and not on the entire image.

A character string is generated based on decoding the one or more characters in the image segment, step 1316.

In some embodiments, the specified geometry is a symbol (e.g., symbol 448 in FIG. 4). In some configurations, the specified geometry is multiple lines of text extending a specified distance. For example, there are two lines of characters extending across a bottom of a passport. The geometry of those lines could be detected, an image of the passport segmented based on a location of the two lines of characters, and OCR run on an image segment. In some configurations, geometry is a label (e.g., boundaries of a label identifying using edge detection). In some embodiments, the geometry is the largest or smallest font or barcode.

Figure 14:
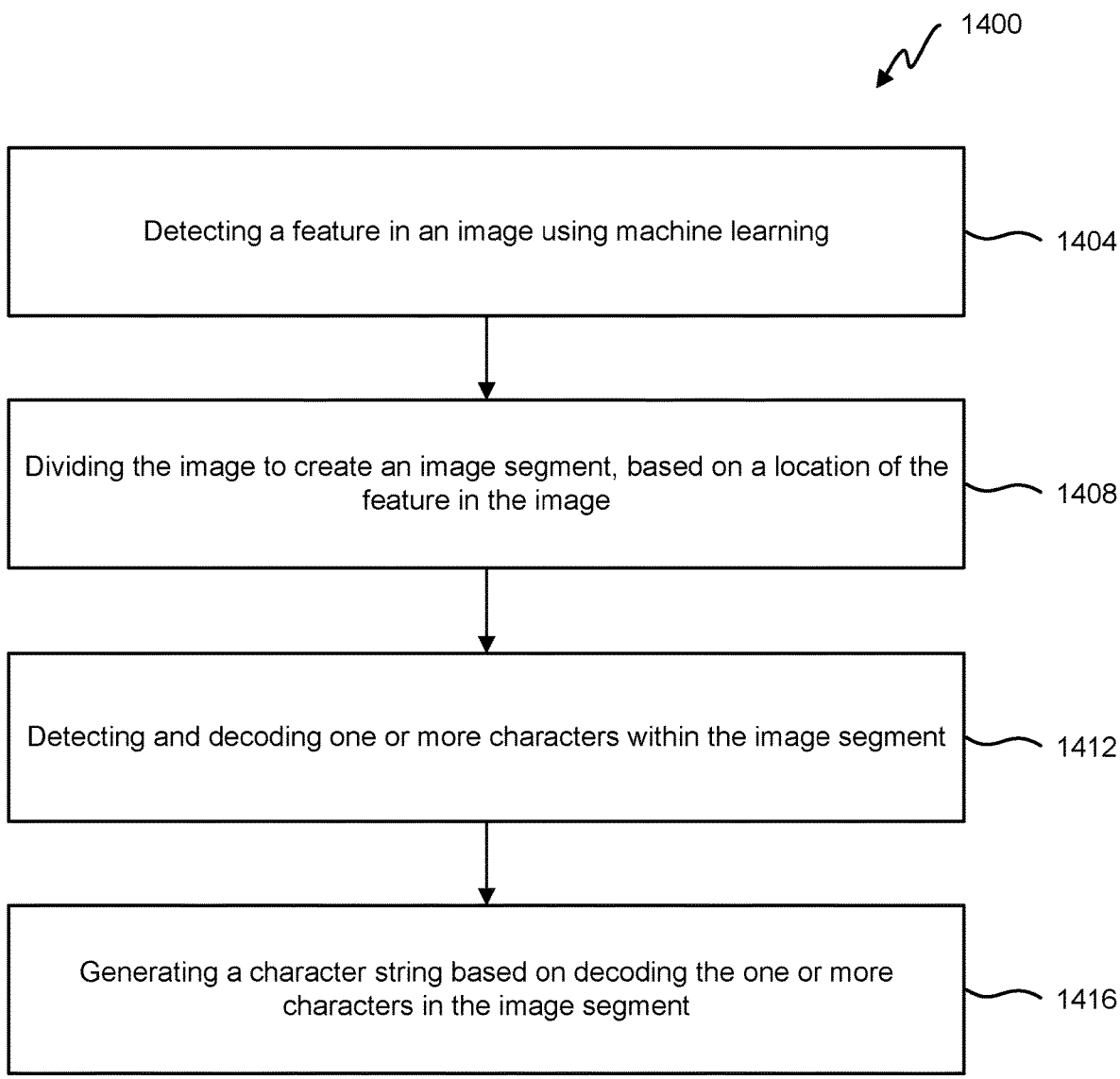
FIG. 14 illustrates a flowchart of an embodiment of a process for image analysis using machine-leaning feature detection for optical character recognition.

FIG. 14 illustrates a flowchart of an embodiment of a process 1400 for image analysis using machine-leaning feature detection for optical character recognition. Machine learning can identify a feature and/or a segment to OCR, and then optical character recognition can be run on the segment.

The process 1400 begins in step 1404 with detecting a feature in an image using machine learning. The image, acquired by a camera, is received by the system. The image is analyzed to detect a feature in the image, wherein detecting the feature is based on machine learning. For example, the feature could be a one-dimensional or two-dimensional barcode (e.g., an arrangement of rectangles, such as squares or parallel lines), a specified class of barcodes, or a label. In step 1408, the image is divided to create an image segment. The image segment is based on the location of the feature in the image. For example, machine learning is used to detect locations of barcodes 708 in FIG. 7.

In step 1412, one or more characters within the image segment are detected and/or decoded. The image segment is analyzed to detect the one or more characters within the image segment, and the one or more characters in the image segment are decoded. For example, an optical character recognition algorithm is run on the image segment and not on the entire image.

A character string is generated based on decoding the one or more characters in the image segment, step 1416.

Figure 15:
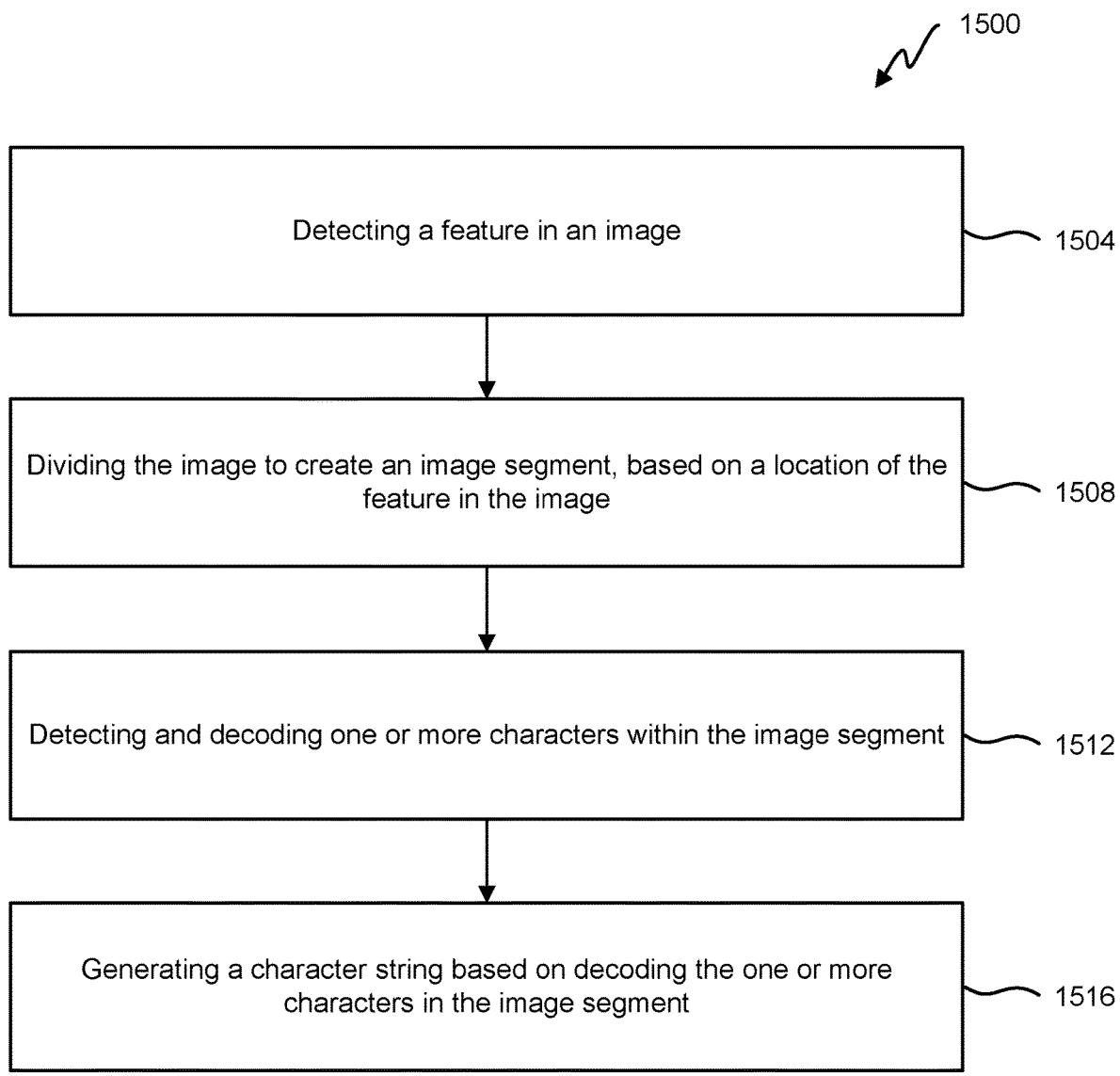
FIG. 15 illustrates a flowchart of an embodiment of a process for image analysis using feature detection for optical character recognition.

FIG. 15 illustrates a flowchart of an embodiment of a process 1500 for image analysis using feature detection for optical character recognition. Feature detection can be implemented by detecting a predefined, visual geometry (e.g., by feature extraction) or by using machine learning.

Process 1500 begins in step 1500 with detecting a feature in an image. Examples of a feature include, but are not limited to, a barcode, a symbol (e.g., symbol 448 in FIG. 4), an edge of a label, lines of text, and a face. The feature can be detected using geometric cues and/or using machine learning. The image, acquired by a camera, is received by the system. The image is analyzed to detect a location of a specified feature within the image. The specified feature is a visual feature. For example, the specified feature could be a one-dimensional or two-dimensional barcode (e.g., an arrangement of rectangles, such as squares or parallel lines), a specified class of barcodes (e.g., numeric only, alpha-numeric, 2-dimensional, etc.), type of barcode (e.g., EAN 8, EAN 13, code 39, code 128, QR code, Aztec code, etc.), or a label.

In step 1408, the image is divided to create an image segment. The image segment is based on the location of the specified feature within the image. In step 1412, one or more characters within the image segment are detected and/or decoded. The image segment is analyzed to detect the one or more characters within the image segment, and the one or more characters in the image segment are decoded. For example, an optical character recognition algorithm is run on the image segment and not on the entire image. A character string is generated based on decoding the one or more characters in the image segment, step 1416.

Figure 16:
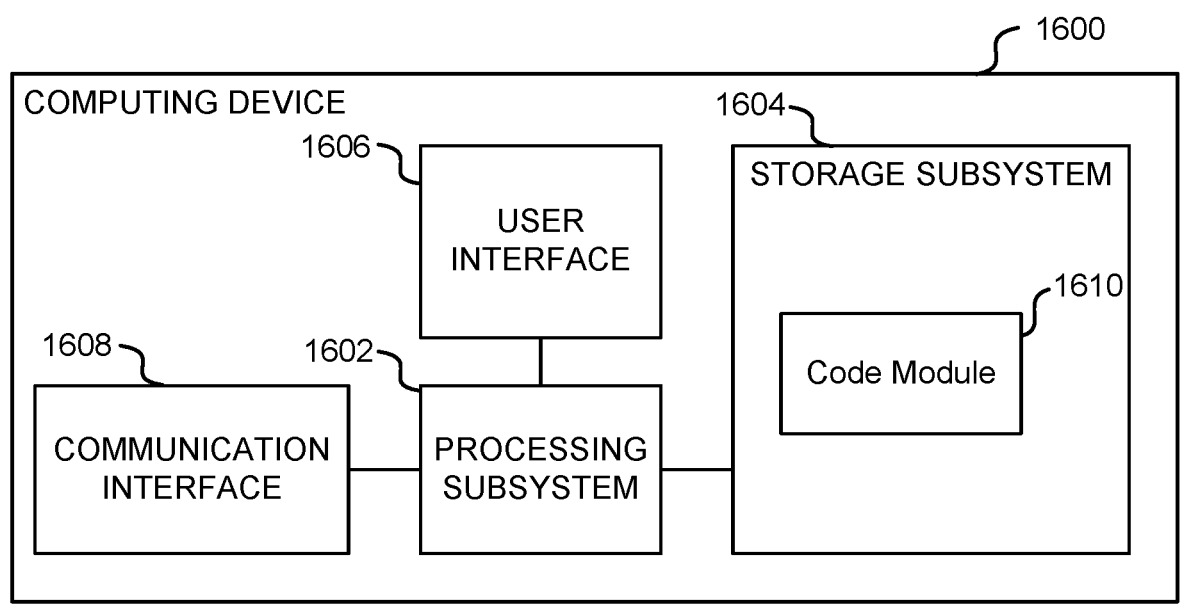
FIG. 16 depicts a block diagram of an embodiment of a computer system.

FIG. 16 is a simplified block diagram of a computing device 1600. Computing device 1600 can implement some or all functions, behaviors, and/or capabilities described above that would use electronic storage or processing, as well as other functions, behaviors, or capabilities not expressly described. Computing device 1600 includes a processing subsystem 1602, a storage subsystem 1604, a user interface 1606, and/or a communication interface 1608. Computing device 1600 can also include other components (not explicitly shown) such as a battery, power controllers, and other components operable to provide various enhanced capabilities. In various embodiments, computing device 1600 can be implemented in a desktop or laptop computer, mobile device (e.g., tablet computer, smart phone, mobile phone), wearable device, media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 1604 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include random access memory (RAM), including dynamic RAM (DRAM), static RAM (SRAM), or battery backed up RAM. In some embodiments, storage subsystem 1604 can store one or more applications and/or operating system programs to be executed by processing subsystem 1602, including programs to implement some or all operations described above that would be performed using a computer. For example, storage subsystem 1604 can store one or more code modules 1610 for implementing one or more method steps described above.

A firmware and/or software implementation may be implemented with modules (e.g., procedures, functions, and so on). A machine-readable medium tangibly embodying instructions may be used in implementing methodologies described herein. Code modules 1610 (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module 1610) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc.

Implementation of the techniques, blocks, steps and means described above may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 1610 may comprise sets of instructions (codes) embodied on a computer-readable medium that directs a processor of a computing device 1600 to perform corresponding actions. The instructions may be configured to run in sequential order, in parallel (such as under different processing threads), or in a combination thereof. After loading a code module 1610 on a general purpose computer system, the general purpose computer is transformed into a special purpose computer system.

Computer programs incorporating various features described herein (e.g., in one or more code modules 1610) may be encoded and stored on various computer readable storage media. Computer readable media encoded with the program code may be packaged with a compatible electronic device, or the program code may be provided separately from electronic devices (e.g., via Internet download or as a separately packaged computer-readable storage medium). Storage subsystem 1604 can also store information useful for establishing network connections using the communication interface 1608.

User interface 1606 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics (e.g., digital-to-analog or analog-to-digital converters, signal processors, etc.). A user can operate input devices of user interface 1606 to invoke the functionality of computing device 1600 and can view and/or hear output from computing device 1600 via output devices of user interface 1606. For some embodiments, the user interface 1606 might not be present (e.g., for a process using an ASIC).

Processing subsystem 1602 can be implemented as one or more processors (e.g., integrated circuits, one or more single-core or multi-core microprocessors, microcontrollers, central processing unit, graphics processing unit, etc.). In operation, processing subsystem 1602 can control the operation of computing device 1600. In some embodiments, processing subsystem 1602 can execute a variety of programs in response to program code and can maintain multiple concurrently executing programs or processes. At a given time, some or all of a program code to be executed can reside in processing subsystem 1602 and/or in storage media, such as storage subsystem 1604. Through programming, processing subsystem 1602 can provide various functionality for computing device 1600. Processing subsystem 1602 can also execute other programs to control other functions of computing device 1600, including programs that may be stored in storage subsystem 1604.

Communication interface 1608 can provide voice and/or data communication capability for computing device 1600. In some embodiments, communication interface 1608 can include radio frequency (RF) transceiver components for accessing wireless data networks (e.g., Wi-Fi network; 3G, 4G/LTE; etc.), mobile communication technologies, components for short-range wireless communication (e.g., using Bluetooth communication standards, NFC, etc.), other components, or combinations of technologies. In some embodiments, communication interface 1608 can provide wired connectivity (e.g., universal serial bus, Ethernet, universal asynchronous receiver/transmitter, etc.) in addition to, or in lieu of, a wireless interface. Communication interface 1608 can be implemented using a combination of hardware (e.g., driver circuits, antennas, modulators/demodulators, encoders/decoders, and other analog and/or digital signal processing circuits) and software components. In some embodiments, communication interface 1608 can support multiple communication channels concurrently. In some embodiments the communication interface 1608 is not used.

It will be appreciated that computing device 1600 is illustrative and that variations and modifications are possible. A computing device can have various functionality not specifically described (e.g., voice communication via cellular telephone networks) and can include components appropriate to such functionality.

Further, while the computing device 1600 is described with reference to particular blocks, it is to be understood that these blocks are defined for convenience of description and are not intended to imply a particular physical arrangement of component parts. For example, the processing subsystem 1602, the storage subsystem, the user interface 1606, and/or the communication interface 1608 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments can be realized in a variety of apparatus including electronic devices implemented using a combination of circuitry and software. Electronic devices described herein can be implemented using computing device 1600.

Various features described herein, e.g., methods, apparatus, computer-readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain principles and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

What is claimed is:

1. An apparatus for segmenting an image, the apparatus comprising:
   a camera; and
   one or more memory device comprising instructions that, when executed, cause one or more processors to perform the following steps:
   receiving an image acquired by the camera, wherein the image comprises a first set of characters and a second set of characters;
   classifying the first set of characters as an identifier;
   classifying the second set of characters as data associated with the identifier;
   dividing the image to create an image segment, after classifying the first set of characters and the second set of characters, wherein the image segment includes the first set of characters and not the second set of characters;
   decoding the first set of characters in the image segment to generate a first character string;
   decoding the second set of characters to generate a second character string; and
   linking the first character string to the second character string based on classifying the first set of characters as the identifier and the second set of characters as the data associated with the identifier.

2. The apparatus of claim 1, wherein the instructions, when executed, further cause the one or more processors to perform the following steps:
   analyzing the image to identify text; and
   dividing the image into one or more segments of text, based on analyzing the image to identify text, before classifying the first set of characters and the second set of characters.

3. The apparatus of claim 1, wherein the second character string comprises information that is also contained in a barcode in the image.

4. A method for segmenting an image, the method comprising:
   receiving an image acquired by a camera, wherein the image comprises a first set of characters and a second set of characters;
   classifying the first set of characters as an identifier;
   classifying the second set of characters as data associated with the identifier;
   dividing the image to create an image segment, after classifying the first set of characters and the second set of characters, wherein the image segment includes the first set of characters and not the second set of characters;
   decoding the first set of characters in the image segment to generate a first character string;
   decoding the second set of characters to generate a second character string; and
   linking the first character string to the second character string based on classifying the first set of characters as the identifier and the second set of characters as the data associated with the identifier.

5. The method of claim 4, wherein decoding the first set of characters is performed by optical character recognition.

6. The method of claim 4, further comprising:
   analyzing the image to identify text; and
   dividing the image into one or more segments of text, based on analyzing the image to identify text, before classifying the first set of characters and the second set of characters.

7. The method of claim 4, wherein the second character string comprises information that is also contained in a barcode in the image.

8. The method of claim 4, further comprising dividing the image to create additional image segments of the second set of characters, wherein creating the additional image segments is performed after dividing the image to create the image segment.

9. The method of claim 4, wherein classifying the first set of characters as the identifier is based on proximity of the first set of characters to a barcode in the image.

10. The method of claim 9, further comprising decoding the barcode.

11. The method of claim 4, wherein classifying the first set of characters is based on machine learning.

12. The method of claim 4, wherein the second set of characters is a serial number, a stock keeping unit, or a model number.

13. The method of claim 4, further comprising decoding the second set of characters, after decoding the first set of characters, based on the first set of characters being the identifier.

14. The method of claim 4, wherein the second set of characters is a date.

15. The method of claim 14, the method further comprising:
- comparing the date, after decoding the second set of characters, to a current date; and
- flagging a label with the second set of characters to be replaced based on the date being expired.

16. A memory device comprising instructions that, when executed, cause one or more processors to perform the following steps for segmenting an image:
- receiving an image acquired by a camera, wherein the image comprises a first set of characters and a second set of characters;
- classifying the first set of characters as an identifier;
- classifying the second set of characters as data associated with the identifier;
- dividing the image to create an image segment, after classifying the first set of characters and the second set of characters, wherein the image segment includes the first set of characters and not the second set of characters;
- decoding the first set of characters in the image segment to generate a first character string;
- decoding the second set of characters to generate a second character string; and
- linking the first character string to the second character string based on classifying the first set of characters as the identifier and the second set of characters as the data associated with the identifier.

17. The memory device of claim 16, wherein decoding the first set of characters and is performed by optical character recognition.

18. The memory device of claim 16, wherein the second character string comprises information that is also contained in a barcode in the image.

19. The memory device of claim 18, wherein the instructions, when executed, cause the one or more processors to perform the following step: decoding the barcode.

20. The memory device of claim 16, wherein:
- the second set of characters is a date; and
- the instructions, when executed, cause the one or more processors to perform the following steps:
  - comparing the date, after decoding the second set of characters, to a current date; and
  - flagging a label with the second set of characters to be replaced based on the date being expired.

* * * * *